United States Patent
Zorn et al.

(10) Patent No.: US 11,131,242 B2
(45) Date of Patent: Sep. 28, 2021

(54) TURBOCHARGER FOR AN INTERNAL COMBUSTION ENGINE

(71) Applicant: BRP-ROTAX GMBH & CO. KG, Gunskirchen (AT)

(72) Inventors: Thomas Zorn, Stadl-Paura (AT); Heinz Kusel, Pennewang (AT); Markus Wolfsgruber, Gunskirchen (AT); Roland Ennsmann, Gunskirchen (AT); Peter Quatember, Gunskirchen (AT)

(73) Assignee: BRP-ROTAX GMBH & CO. KG, Gunskirchen (AT)

( * ) Notice: Subject to any disclaimer, the term of this patent is extended or adjusted under 35 U.S.C. 154(b) by 0 days.

(21) Appl. No.: 16/766,626

(22) PCT Filed: Nov. 23, 2018

(86) PCT No.: PCT/EP2018/082456
§ 371 (c)(1),
(2) Date: May 22, 2020

(87) PCT Pub. No.: WO2019/101974
PCT Pub. Date: May 31, 2019

(65) Prior Publication Data
US 2021/0010420 A1    Jan. 14, 2021

Related U.S. Application Data

(60) Provisional application No. 62/590,416, filed on Nov. 24, 2017.

(51) Int. Cl.
*F02C 6/12* (2006.01)
*F01D 25/26* (2006.01)
(Continued)

(52) U.S. Cl.
CPC ............... *F02C 6/12* (2013.01); *F01D 25/16* (2013.01); *F02B 39/005* (2013.01); *F02B 39/14* (2013.01);
(Continued)

(58) Field of Classification Search
CPC .. F02B 39/14; F02B 39/005; F02B 2075/025; F02C 6/12; F01D 25/16; F16C 19/184; F16C 33/6685; F05D 2220/40
(Continued)

(56) References Cited

U.S. PATENT DOCUMENTS 2,853,948 A * 9/1958 Aspelin .................. F01D 25/18
                                                     417/407
4,420,160 A * 12/1983 Laham .................... F04D 29/12
                                                     277/306
(Continued)

FOREIGN PATENT DOCUMENTS

EP      2167792 B1    6/2011
EP      2535526 B1    10/2013
(Continued)

OTHER PUBLICATIONS

International Search Report of PCT/EP2018/082456; Beguin-Adriaenssens; dated May 10, 2019.
(Continued)

*Primary Examiner* — Thai Ba Trieu
(74) *Attorney, Agent, or Firm* — BCF LLP

(57) ABSTRACT

A turbocharger for an engine includes a housing, a shaft, a turbine wheel mounted to the shaft for rotation therewith, a compressor wheel mounted to the shaft for rotation therewith, and a bearing cartridge rotatably supporting the shaft relative to the housing. The housing is positioned axially between the turbine and compressor wheels. The bearing cartridge includes an inner ring mounted to the shaft, an
(Continued)

outer ring disposed between the inner ring and the housing and movable relative to the housing, and a first and a second plurality of roller elements axially spaced apart from one another and disposed radially between the inner and outer rings to rotatably support the inner ring relative to the outer ring. A radial gap (RD) is defined between the outer ring (134) and the housing (126). Lubricant flows into the radial gap and radially separates the outer ring from the housing during operation of the turbocharger.

20 Claims, 16 Drawing Sheets

(51) Int. Cl.
| | | |
|---|---|---|
| *F02B 39/00* | (2006.01) | |
| *F02B 39/14* | (2006.01) | |
| *F16C 19/18* | (2006.01) | |
| *F01D 25/16* | (2006.01) | |
| *F02B 75/02* | (2006.01) | |
| *F16C 33/66* | (2006.01) | |

(52) U.S. Cl.
CPC .... *F02B 2075/025* (2013.01); *F05D 2220/40* (2013.01); *F16C 19/184* (2013.01); *F16C 33/6685* (2013.01)

(58) Field of Classification Search
USPC .......... 60/605.3; 417/407; 384/99, 467, 474, 384/476; 184/6.11, 6.16
See application file for complete search history.

(56) References Cited

U.S. PATENT DOCUMENTS

| | | | | |
|---|---|---|---|---|
| 4,798,523 A * | 1/1989 | Glaser | ............... | F16C 19/184 417/407 |
| 4,943,170 A * | 7/1990 | Aida | ............... | F16C 19/548 384/99 |
| 4,997,290 A * | 3/1991 | Aida | ............... | F01D 25/164 384/99 |
| 5,028,150 A * | 7/1991 | Kronenberger | ....... | F16C 19/184 384/476 |
| 5,106,208 A * | 4/1992 | Bobo | ............... | F01D 25/164 384/99 |
| 5,145,334 A * | 9/1992 | Gutknecht | ............ | F16C 19/184 417/407 |
| 5,207,511 A * | 5/1993 | Bobo | ............... | F01D 25/164 384/99 |
| 5,921,683 A * | 7/1999 | Merritt | ............... | F16C 17/024 384/103 |
| 7,025,579 B2 * | 4/2006 | Woollenweber | ........ | F02B 39/14 417/407 |
| 7,104,693 B2 | 9/2006 | Mavrosakis | | |
| 7,461,979 B2 * | 12/2008 | Mavrosakis | ............ | F01D 25/16 384/99 |
| 7,670,056 B2 * | 3/2010 | Petitjean | ............... | F01D 25/16 384/284 |
| 7,832,938 B2 * | 11/2010 | McKeirnan, Jr. | ...... | F16C 19/548 417/407 |
| 7,987,599 B2 * | 8/2011 | Mavrosakis | .......... | F16C 19/184 384/474 |
| 8,807,840 B2 | 8/2014 | House et al. | | |
| 8,956,048 B2 | 2/2015 | Schmidt | | |
| 8,961,128 B2 | 2/2015 | Mavrosakis et al. | | |
| 9,046,036 B2 * | 6/2015 | Petitjean | ............... | F02C 6/12 |
| 9,404,399 B2 | 8/2016 | Doppelbauer et al. | | |
| 9,416,727 B2 * | 8/2016 | Lancaster | ............... | F02C 6/12 |
| 9,464,637 B2 * | 10/2016 | Nguyen-Schaefer | ............... | F16C 19/184 |
| 9,745,992 B2 * | 8/2017 | Barber | ............... | F16C 19/184 |
| 10,316,742 B2 * | 6/2019 | Hettinger | ............... | F02B 39/14 |
| 2003/0123768 A1 | 7/2003 | Woollenweber | | |
| 2011/0236193 A1 * | 9/2011 | Chriss | ............... | F16C 19/184 384/467 |
| 2012/0017588 A1 | 1/2012 | Kitagawa et al. | | |
| 2012/0321491 A1 * | 12/2012 | Viault | ............... | F02C 6/12 417/406 |
| 2013/0216406 A1 * | 8/2013 | Berruet | ............... | F01D 25/16 417/407 |
| 2013/0224015 A1 * | 8/2013 | Berruet | ............... | F01D 25/16 415/229 |
| 2013/0287547 A1 * | 10/2013 | Berruet | ............... | F16C 19/184 384/474 |
| 2014/0079572 A1 * | 3/2014 | Iwata | ............... | F01D 25/16 417/406 |
| 2016/0265385 A1 | 9/2016 | Annati et al. | | |

FOREIGN PATENT DOCUMENTS

| | | | | |
|---|---|---|---|---|
| EP | 2711573 A1 | | 3/2014 | |
| GB | 935457 A | * | 8/1963 | .......... F16C 33/1075 |
| JP | 2010133266 A | * | 6/2010 | ............ F16C 19/548 |
| JP | 2010133266 A | | 6/2010 | |
| JP | 2011153569 A | | 8/2011 | |
| WO | 2008011400 A2 | | 1/2008 | |

OTHER PUBLICATIONS

English translation of JP2011153569A retrieved from https://patents.google.com/patent/JP2011153569A/en?pq=jp2011153569 on May 21, 2020.
English translation of EP2167792B1 retrieved from https://patents.google.com/patent/EP2167792B1/en?pq=EP2167792 on May 21, 2020.
English translation of JP2010133266A retrieved from https://patents.google.com/patent/JP2010133266A/en?pq=JP2010133266A on May 4, 2021.
Office Action issued from the EPO dated Mar. 4, 2021 in connection with the corresponding application No. 18808334.9.

\* cited by examiner

TURBOCHARGER FOR AN INTERNAL COMBUSTION ENGINE

CROSS-REFERENCE

The present application claims priority to U.S. Provisional Patent Application No. 62/590,416, filed on Nov. 24, 2017, the entirety of which is incorporated herein by reference.

FIELD OF TECHNOLOGY

The present technology relates to turbochargers for internal combustion engines.

BACKGROUND

Internal combustion engines are often provided with a turbocharger that is configured to increase the engine's efficiency by feeding additional air into the engine's cylinder(s). The turbocharger is turbine-driven and requires lubrication for its bearing unit that supports a rotating turbine shaft relative to a housing of the turbocharger.

Lubrication of the turbocharger's bearing unit can be demanding. As such, a significant amount of lubricant (oil) is routed to the bearing unit of the turbocharger to maintain its function. In addition, the lubricant is highly pressurized in order to promote its flow through the bearing unit. In order to provide sufficient lubrication to the bearing unit, the turbocharger is sometimes provided with a dedicated lubrication system that routes lubricant to the turbocharger exclusively.

There is therefore a desire for a turbocharger for an engine with alleviated lubrication requirements.

SUMMARY

It is an object of the present technology to ameliorate at least some of the inconveniences present in the prior art.

According to one aspect of the present technology, there is provided a turbocharger for an engine. The turbocharger includes: a housing; a shaft having a first end and a second end opposite the first end; a turbine wheel mounted to the first end of the shaft for rotation therewith; a compressor wheel mounted to the second end of the shaft for rotation therewith; and a bearing cartridge rotatably supporting the shaft relative to the housing. The housing is positioned axially between the turbine wheel and the compressor wheel. The bearing cartridge includes: an inner ring mounted to the shaft; an outer ring disposed between the inner ring and the housing and movable relative to the housing; a first plurality of roller elements disposed radially between the inner and outer rings and rotatably supporting the inner ring relative to the outer ring; and a second plurality of roller elements disposed radially between the inner and outer rings and rotatably supporting the inner ring relative to the outer ring. The second plurality of roller elements is axially spaced apart from the first plurality of roller elements. A radial gap is defined between the outer ring and the housing. Lubricant flows into the radial gap and radially separates the outer ring from the housing during operation of the turbocharger.

In some implementations of the present technology, the outer ring is rotatable relative to the housing.

In some implementations of the present technology, the housing defines a lubricant inlet for feeding lubricant into the housing and a lubricant outlet for discharging lubricant from the housing. The lubricant inlet opens into the radial gap.

In some implementations of the present technology, the outer ring has a first end and a second end opposite the first end. The lubricant inlet is located axially between the first and second ends of the outer ring.

In some implementations of the present technology, the lubricant inlet is generally aligned with an axial center of the outer ring.

In some implementations of the present technology, the outer ring has an inner surface facing the inner ring and an outer surface opposite the inner surface. The outer surface of the outer ring defines a radial recess. The radial recess is generally aligned with the lubricant inlet.

In some implementations of the present technology, an axial gap is defined between an end of the outer ring and the housing. During operation of the turbocharger, lubricant flows into the axial gap and axially separates the end of the outer ring from the housing.

In some implementations of the present technology, the housing defines a bearing chamber. The outer ring has an inner surface facing the inner ring and an outer surface opposite the inner surface. The bearing cartridge is disposed within the bearing chamber of the housing. A radial dimension of the radial gap is equal to a difference between a radius of the bearing chamber and a radius of the outer surface of the outer ring. An axial dimension of the axial gap is equal to half of a difference between a length of the bearing chamber and a length of the outer ring. The radial dimension of the radial gap is substantially equal to the axial dimension of the axial gap.

In some implementations of the present technology, the turbocharger also includes a compressor backplate disposed axially between the housing and the compressor wheel. The axial gap is a first axial gap. A second axial gap is defined between the outer ring and the compressor backplate. During operation of the turbocharger, lubricant flows into the second axial gap and axially separates the outer ring from the compressor backplate.

In some implementations of the present technology, the compressor backplate is screwed onto the housing.

In some implementations of the present technology, the compressor backplate defines a plurality of radially-extending passages and an annular passage connected to the radially-extending passages. During operation of the turbocharger, lubricant flows from the radial gap into the radially-extending passages and into the annular passage.

In some implementations of the present technology, the housing defines a lubricant collecting space for collecting lubricant flowing out of the bearing cartridge. During operation of the turbocharger, lubricant flows from the annular passage of the compressor backplate into the lubricant collecting space.

In some implementations of the present technology, the lubricant collecting space is connected to the lubricant outlet. During operation of the turbocharger, lubricant flows from the lubricant collecting space through the lubricant outlet to flow out of the housing.

In some implementations of the present technology, an inner bearing space is defined between the outer ring and the inner ring. The outer ring has an inner surface facing the inner ring and an outer surface opposite the inner surface. The outer ring defines at least one bore extending from the outer surface to the inner surface of the outer ring. During operation of the turbocharger, lubricant flows from the radial gap into the inner bearing space through the at least one bore of the outer ring.

In some implementations of the present technology, the at least one bore of the outer ring is located axially between the first and second plurality of roller elements.

In some implementations of the present technology, the at least one bore of the outer ring is located axially between the lubricant inlet and one of the first and second pluralities of roller elements.

In some implementations of the present technology, the at least one bore includes a first bore and a second bore. The first bore is located axially between the lubricant inlet and the first plurality of roller elements and the second bore is located axially between the lubricant inlet and the second plurality of roller elements.

In some implementations of the present technology, the at least one bore is at least four bores.

In some implementations of the present technology, the outer surface of the outer ring defines a radial recess. The at least one bore of the outer ring extends from the radial recess to the inner surface of the outer ring.

In some implementations of the present technology, the housing defines a bearing chamber containing the bearing cartridge. The lubricant is discharged from an axial end of the bearing chamber.

In some implementations of the present technology, during operation of the turbocharger, lubricant flows through the housing at a rate of less than or equal to 2000 cm$^3$ per hour.

In some implementations of the present technology, during operation of the turbocharger, lubricant flowing through the housing has a pressure of less than or equal to 1 bar.

In some implementations of the present technology, the turbocharger also includes a cooling system. The cooling system includes a coolant chamber defined in the housing, and first, second and third ports fluidly communicating with the coolant chamber. The first port is an inlet port for feeding coolant into the coolant chamber. The second port is an outlet port for discharging coolant from the coolant chamber. The third port is blocked.

In some implementations of the present technology, the radial gap extends along a majority of a length of the outer ring.

In some implementations of the present technology, the radial gap extends along an entirety of the length of the outer ring.

In some implementations of the present technology, the inner ring includes two inner ring parts axially adjacent to one another.

According to another aspect of the present technology, there is provided a vehicle power plant including an internal combustion engine, a turbocharger, a first pump, and a second pump. The engine includes: a crankcase; a crankshaft disposed at least in part in the crankcase; and a cylinder block connected to the crankcase. The cylinder block defines a cylinder having a cylinder axis. The cylinder defines at least one exhaust port for discharging exhaust fluid from the cylinder and at least one intake port for receiving air into the cylinder. The engine also includes a piston movably disposed within the cylinder and operatively connected to the crankshaft, an exhaust valve assembly for selectively opening and at least partially closing the at least one exhaust port, and a lubricant reservoir for containing lubricant. The piston is movable along the cylinder axis in a reciprocating motion. The turbocharger fluidly communicates with the at least one intake port and the at least one exhaust port. The first pump is fluidly connected to the lubricant reservoir, the crankcase, and the turbocharger for pumping lubricant from the lubricant reservoir to the crankcase and to the turbocharger. The second pump is fluidly connected to the turbocharger and the exhaust valve assembly for pumping lubricant from the turbocharger to the exhaust valve assembly.

In some implementations of the present technology, the first pump includes at least one inlet port for receiving lubricant from the lubricant reservoir, at least one first outlet port for feeding lubricant from the first pump to the crankcase, and at least one second outlet port for feeding lubricant from the first pump to the turbocharger.

In some implementations of the present technology, the second pump includes a reed valve fluidly connected to the crankcase. During operation of the engine, pressure pulsations generated within the crankcase cause the reed valve to open and close such as to pump lubricant to the exhaust valve assembly.

According to another aspect of the present technology, there is provided a turbocharger for an engine. The turbocharger includes: a housing; a shaft having a first end and a second end opposite the first end; a turbine wheel mounted to the first end of the shaft for rotation therewith; and a compressor wheel mounted to the second end of the shaft for rotation therewith. The housing is positioned axially between the turbine wheel and the compressor wheel. The housing defines a lubricant inlet, a lubricant outlet and a bearing chamber. The turbocharger also includes a bearing cartridge disposed in the bearing chamber and rotatably supporting the shaft relative to the housing. The bearing cartridge includes: an inner ring mounted to the shaft; an outer ring disposed between the inner ring and the housing and movable relative to the housing; a first plurality of roller elements disposed radially between the inner and outer rings and rotatably supporting the inner ring relative to the outer ring; and a second plurality of roller elements disposed radially between the inner and outer rings and rotatably supporting the inner ring relative to the outer ring. The second plurality of roller elements is axially spaced apart from the first plurality of roller elements. A radius of the outer ring is smaller than a radius of the bearing chamber of the housing such that a radial gap is defined between the outer ring and the bearing chamber. The lubricant inlet and the lubricant outlet are in fluid communication with the radial gap.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

The present technology will be described below with respect to a direct fuel injection, two-stroke, inline, two-cylinder internal combustion engine for a vehicle. It is contemplated that at least some aspects of the present technology could be provided on a two-stroke internal combustion engine that is carbureted or has semi-direct injection, that has cylinders arranged in a V-type or other arrangement, and/or that has only one or more than two cylinders.

Figure 1:
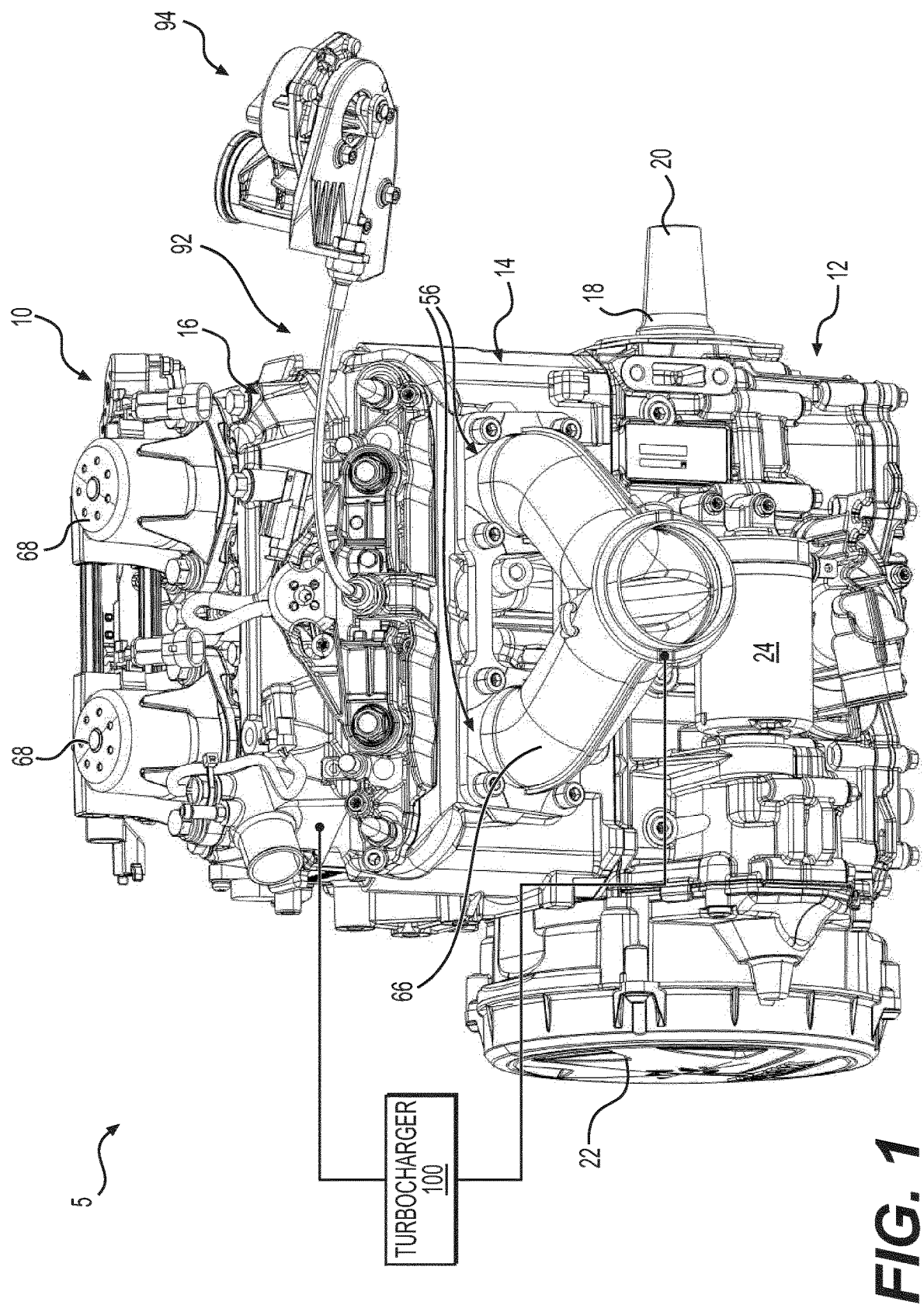
FIG. 1 is a front perspective view of a vehicle power plant including a two-stroke internal combustion engine.

FIG. 1 illustrates a power plant 5 for a vehicle (not shown) such as a snowmobile, including an internal combustion engine 10. The engine 10 operates on a two-stroke engine cycle such that the engine 10 completes a power cycle with two strokes (an upstroke and a downstroke) of the engine's piston(s). The engine 10 can thus be referred to as a two-stroke engine. The engine 10 has a crankcase 12, a cylinder block 14 connected on top of the crankcase 12 and a cylinder head 16 connected on top of the cylinder block 14.

The crankcase 12 rotationally supports a crankshaft 18. The crankshaft 18 has a portion disposed inside the crankcase 12 and an end 20 extending outside the crankcase 12. The end 20 of the crankshaft 18 connects to a transmission of a vehicle or another mechanical component to be driven by the engine 10. As such, the side of the engine 10 from which the end 20 of the crankshaft 18 protrudes is referred to herein as the power take-off side of the engine 10. It is contemplated that the crankshaft 18 may not have the end protruding from the crankcase 12 and that instead the engine 10 could have another shaft, called output shaft, rotationally supported by the crankcase 12 and driven by the crankshaft 18. In such an implementation, it is the output shaft that protrudes from the crankcase 12 and is connected to the mechanical component to be driven by the engine 10. It is contemplated that the output shaft could be coaxial with or offset from the crankshaft 18.

A magneto (not shown) is connected to the end of the crankshaft 18 opposite the end 20. The magneto generates electricity as the crankshaft 18 makes it rotate. The magneto is disposed in a chamber defined between the crankcase 12 and a cover 22 fastened to the end of the crankcase 12.

An electric starter motor 24 is connected to the side of the crankcase 12. The starter motor 24 selectively engages the crankshaft 18 via gears (not shown) to cause the crankshaft 18 to turn before the engine 10 can run on its own as a result of the internal combustion process in order to start the engine 10.

A lubricant pump 26 (schematically shown in FIG. 2) is fluidly connected to various parts of the engine 10 to circulate lubricant (i.e., oil) through the engine 10. The oil pump 26 pumps oil from an oil reservoir 28 connected to a bottom of the crankcase 12. Operation of the oil pump 26 will be described in more detail below.

Figure 3:
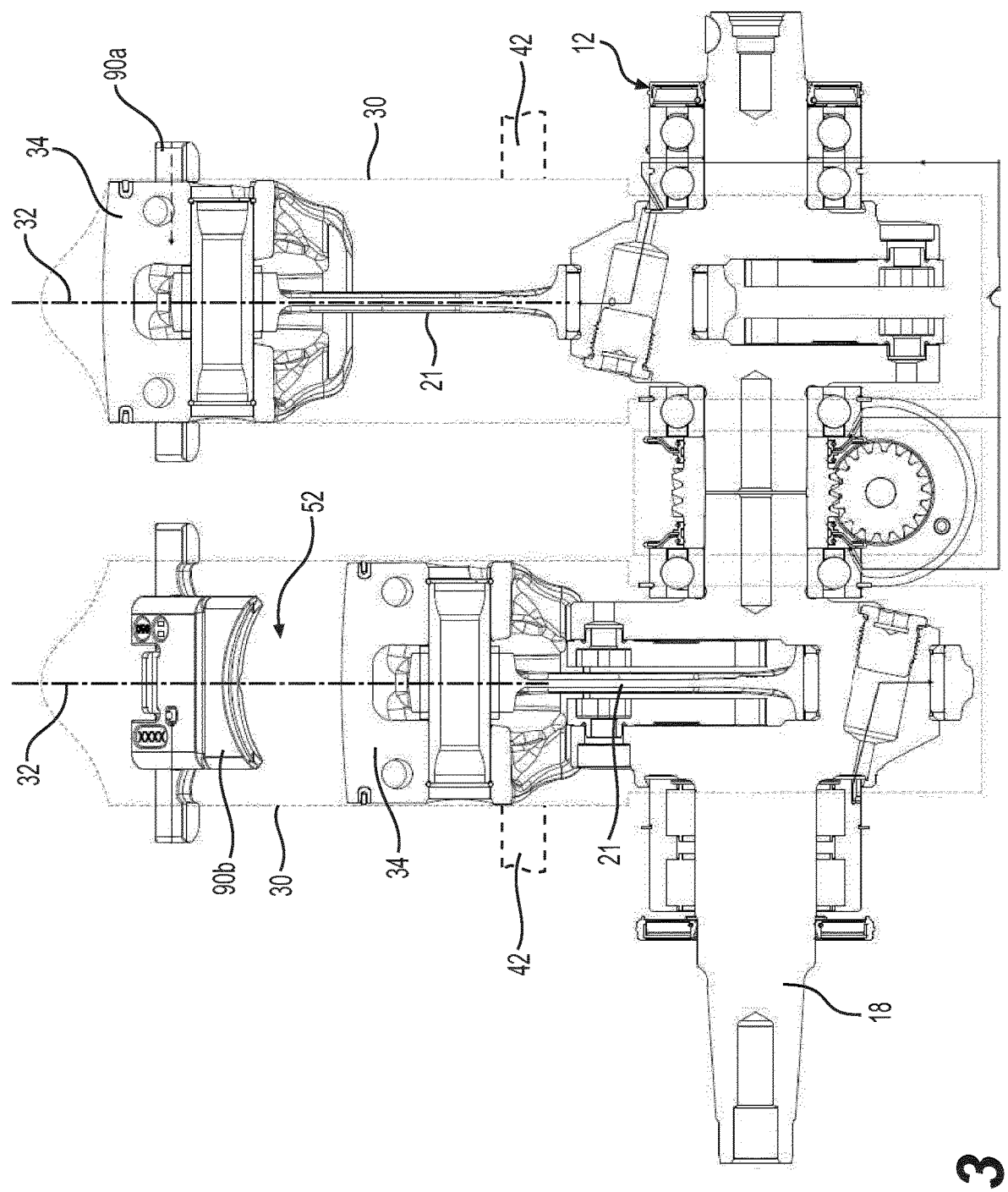
FIG. 3 is a cross-sectional view of some internal components of the engine of FIG. 1, including pistons and a crankshaft.
Figure 4:
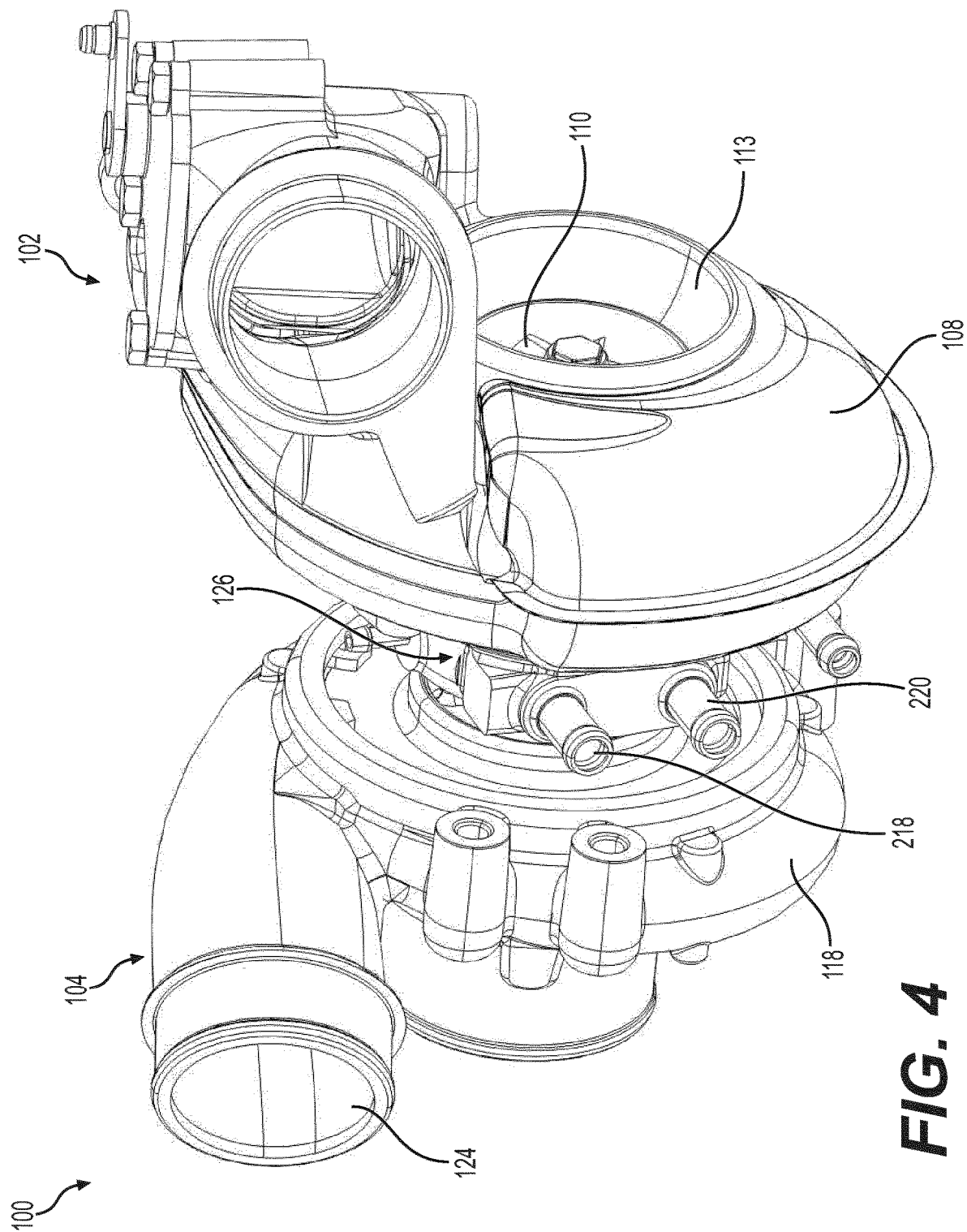
FIG. 4 is right side perspective view of a turbocharger for the engine.
Figure 5:
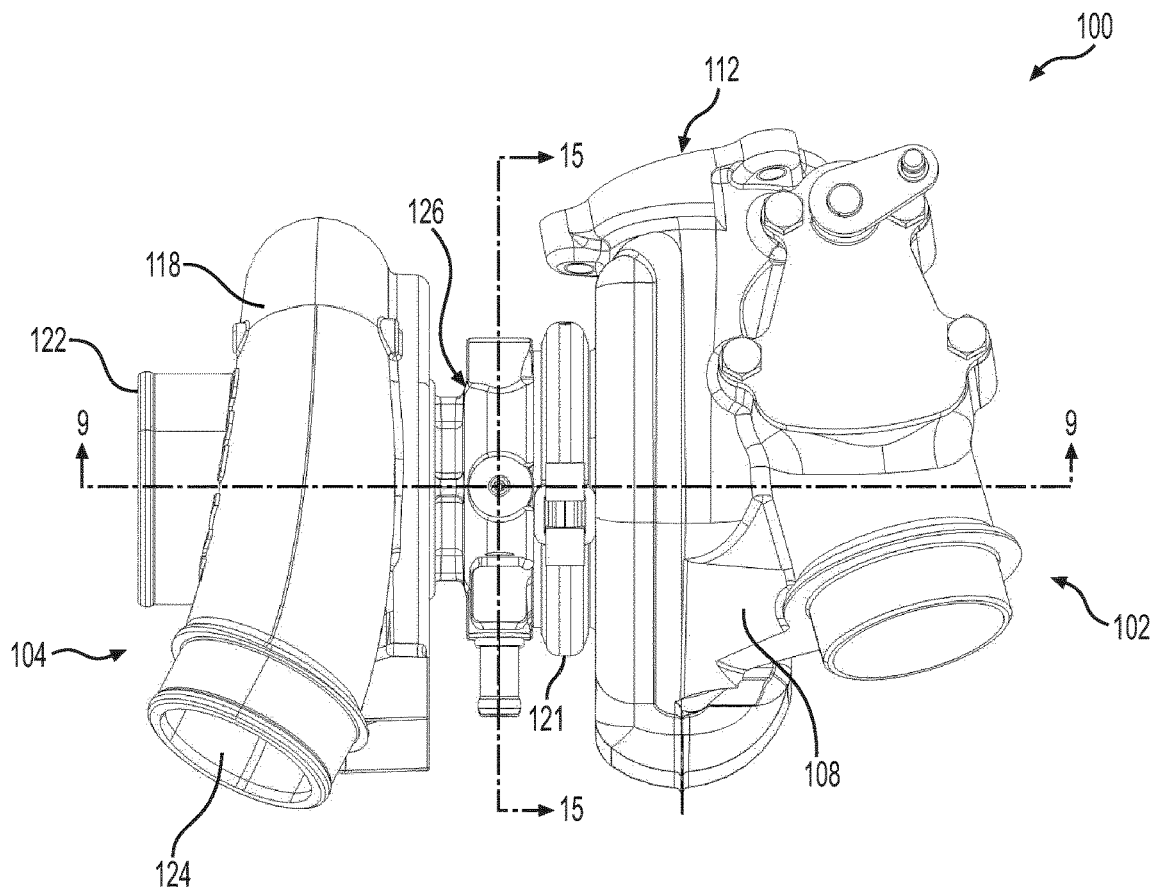
FIG. 5 is a top plan view of the turbocharger of FIG. 4.
Figure 6:
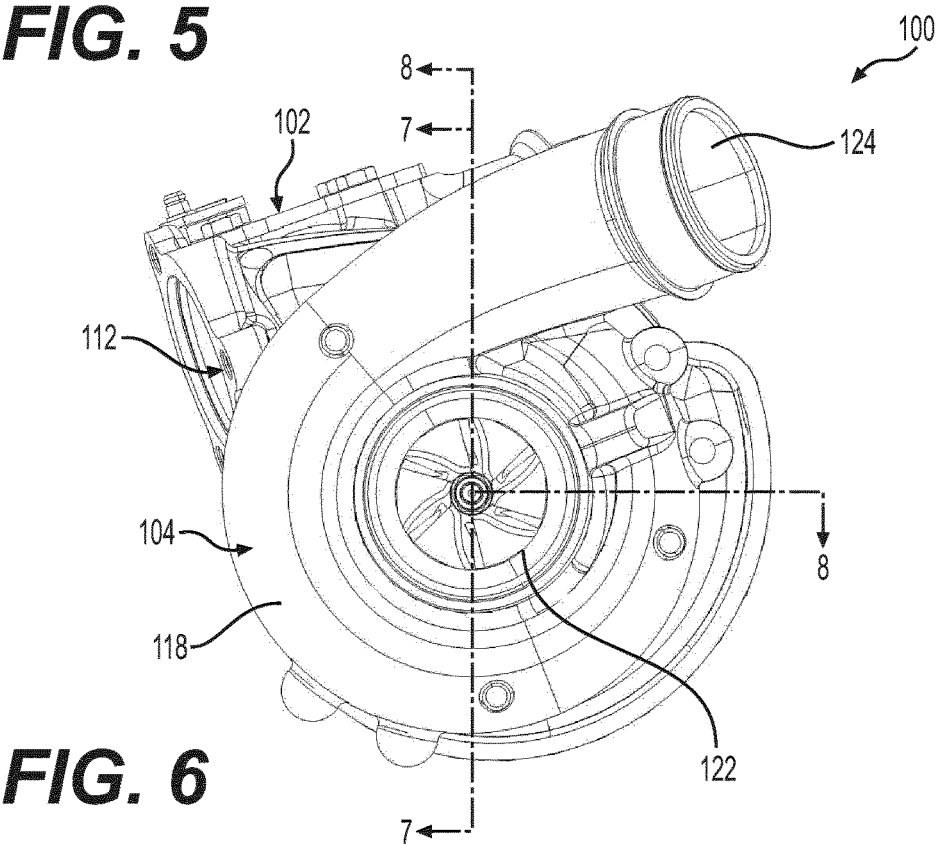
FIG. 6 is a left side elevation view of the turbocharger of FIG. 4.

As shown in FIG. 3, the cylinder block 14 defines two cylinders 30 adjacent to one another in a lateral direction of the engine 10. Each cylinder 30 defines a cylinder axis 32 along which the cylinder 30 extends. The engine 10 has two pistons 34, each of which is disposed within a corresponding one of the cylinders 30. During operation of the engine 10, each piston 34 moves along the cylinder axis 32 of its corresponding cylinder 30 in a reciprocating motion including an upstroke (whereby the piston 34 moves toward an upper end of the cylinder 30) and a downstroke (whereby the piston 34 moves away from the upper end of the cylinder 30). Each piston 34 is connected to the crankshaft 18 by a connecting rod 21 so as to rotate the crankshaft 18 during the upstroke and downstroke of the piston 34.

Each cylinder 30 defines an exhaust port 52 for discharging exhaust fluids from the cylinder 30. For each cylinder 30, the cylinder block 14 defines an exhaust passage 56 extending from the exhaust port 52. For each cylinder 30, the cylinder block 14 defines a valve receiving passage (not shown) that communicates with the exhaust port 52. An exhaust valve 90a, 90b (FIG. 3) is received in each valve receiving passage for selectively opening and at least partially closing the exhaust port 52 such as to allow or impede passage of exhaust fluids from the cylinders 30 to the exhaust passages 56. The two exhaust valves 90a, 90b are part of an exhaust valve assembly 92 that has a portion connected to the cylinder block 14. An implementation of the exhaust valve assembly 92 is described in U.S. Pat. No. 9,404,399 which issued on Aug. 2, 2016 and is incorporated herein by reference. An exhaust valve actuator 94 of the exhaust valve assembly 92 is configured to control movement of the exhaust valves 90a, 90b between their various positions. Other implementations of the exhaust valve assembly 92 are contemplated.

The power plant 5 also includes a turbocharger 100 provided for feeding air into the cylinders 30 in order to improve the efficiency of the engine 10. The configuration of the turbocharger 100 will be described in more detail below.

In this implementation, each cylinder 30 has a single exhaust port 52. However, it is contemplated that, in alternative implementations, each cylinder 30 could define auxiliary exhaust ports that fluidly communicate with the exhaust passage 56. For example, such auxiliary exhaust ports could be disposed on either side of the exhaust port 52. It is also contemplated that each cylinder 30 could have only one or more than two auxiliary exhaust ports.

Figure 2:
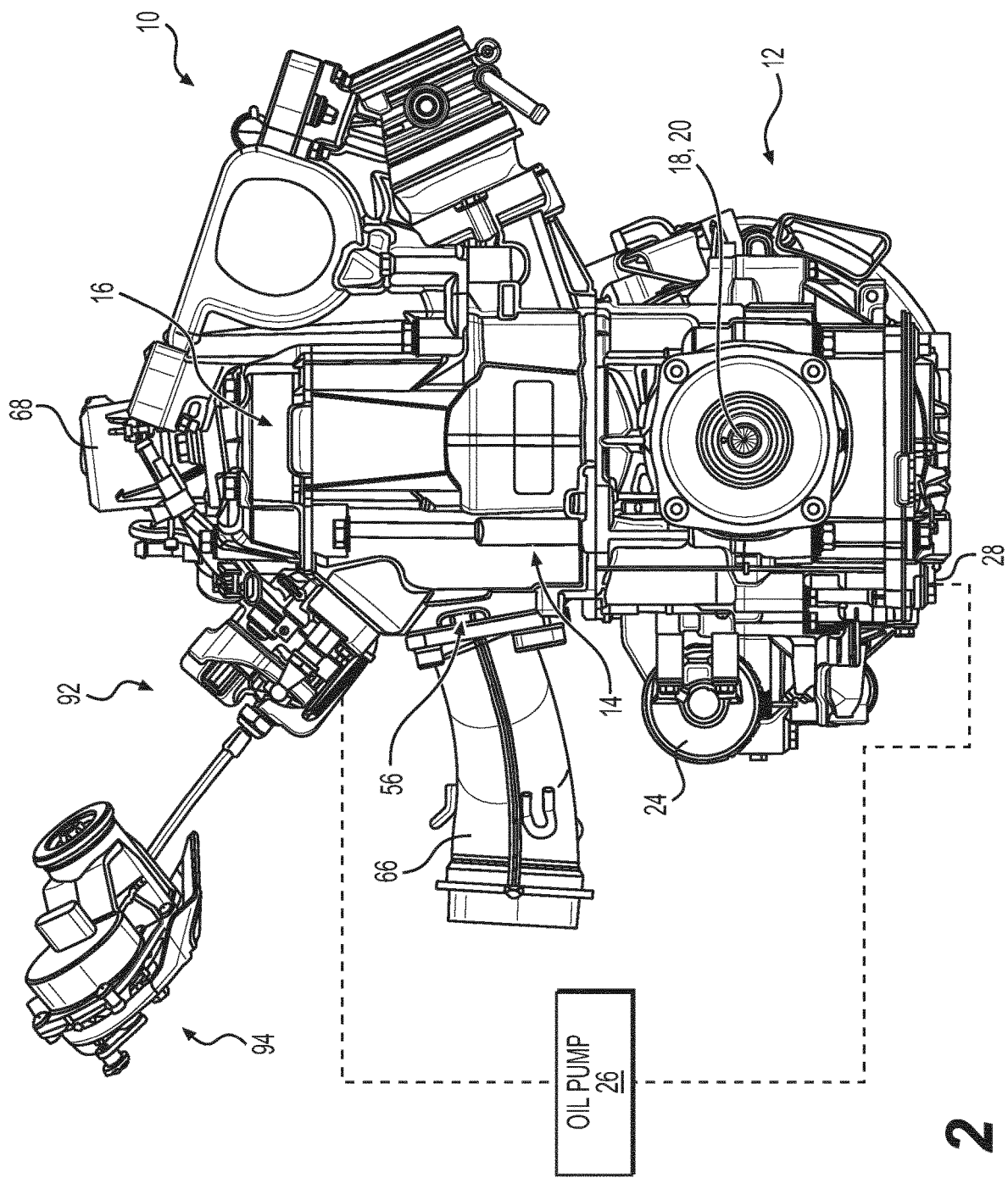
FIG. 2 is a left side elevation view of the engine of FIG. 1.

As shown in FIGS. 1 and 2, an exhaust manifold 66 is connected to the cylinder block 14 at the exhaust passages 56. Notably, the exhaust manifold 66 has two inlets in alignment with the two exhaust passages 56 and a single outlet.

For each cylinder 30, the cylinder block 14 defines an intake port 42 (schematically illustrated in FIG. 3) for receiving air into the cylinder 30. A pair of reed valves (not shown) is disposed inside each air intake port 42 to prevent fluid from escaping the interior of the engine 10 via the air intake ports 42. While in this implementation each cylinder 30 defines a single intake port 42, it is contemplated that each cylinder 30 could define additional intake ports in alternative implementations.

The cylinder head 16 closes the tops of the cylinders 30 such that for each cylinder 30 a variable volume combustion chamber is defined between the cylinder 30, its corresponding piston 34 and the cylinder head 16. With reference to FIG. 1, two fuel injectors 68 and two spark plugs (not shown), one of each per cylinder 30, are connected to the cylinder head 16. The fuel injectors 68 inject fuel directly in the combustion chambers. The spark plugs ignite the fuel-air mixture in the combustion chambers.

The operation of the fuel injectors 68, the spark plugs, the starter motor 24 and the oil pump 26 is controlled by an electronic control unit (ECU) (not shown) in a manner that is known in the art.

Figure 7:
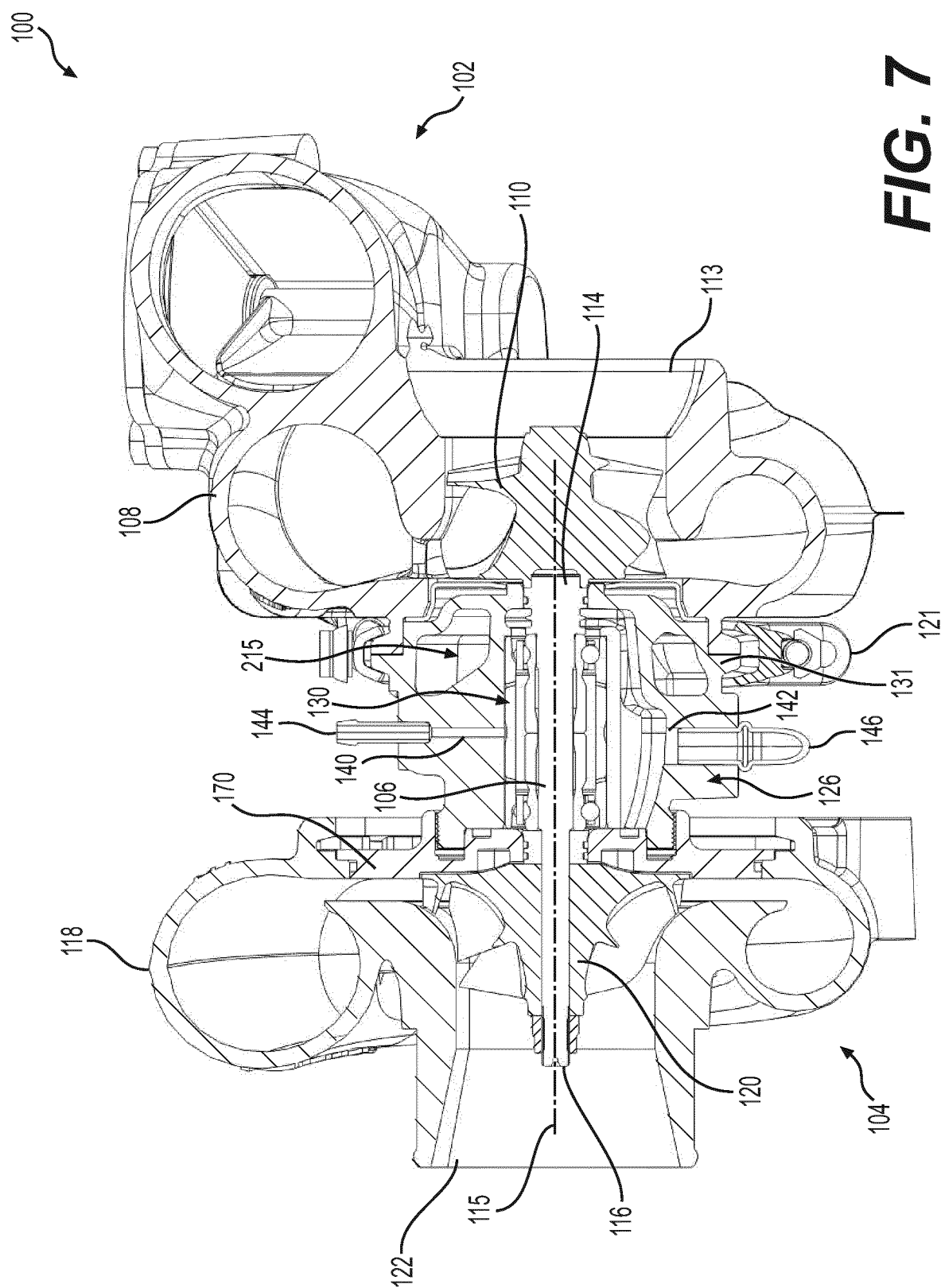
FIG. 7 is a cross-sectional view of the turbocharger of FIG. 4 taken along line 7-7 in FIG. 6.

With reference to FIGS. 4 to 7, the turbocharger 100 is in fluid communication with the intake and exhaust ports 42, 52 of the cylinders 30 so as to receive exhaust gases from the engine 10 via the exhaust manifold 66 and to route air into the cylinder 30 via the intake ports 42. The turbocharger 100 comprises a turbine 102 and a compressor 104 which are rotatably linked to one another via a shaft 106 defining an axial direction of the turbocharger 100 (FIG. 7).

As shown in FIG. 7, the turbine 102 comprises a turbine housing 108 and a turbine wheel 110 housed within the turbine housing 108. The turbine housing 108 is fluidly connected to the exhaust port 52 of the cylinder 30 via the exhaust manifold 66 and exhaust pipe to receive the exhaust gases discharged therefrom. To that end, the turbine housing 108 defines an inlet 112 in fluid communication with the outlet of the exhaust pipe and through which the exhaust gases enter the turbine housing 108. The turbine housing 108 also defines an outlet 113 for expelling the exhaust gases. The outlet 113 is in fluid communication with the exhaust system of the engine 10. The turbine wheel 110 is mounted to an end 114 of the shaft 106 for rotation therewith and is driven by the exhaust gases received in the turbine housing 108 through the inlet 112. In use, the exhaust gases that enter the turbine housing 108 cause the turbine wheel 110, and thus the shaft 106 to which the turbine wheel 110 is mounted, to rotate about an axis 115 of the shaft 106.

The compressor 104 includes a compressor housing 118 and a compressor wheel 120 housed within the compressor housing 118. The compressor housing 118 defines an inlet 122 through which ambient air enters the compressor housing 118. The compressor housing 118 also defines an outlet 124 in fluid communication with the intake ports 42 of the cylinders 30. The compressor wheel 120 is mounted to an end 116 of the shaft 106 (opposite the end 114) for rotation therewith and is driven by rotation of the shaft 106. Thus, during operation of the turbocharger 100, the compressor wheel 120 rotates together with the shaft 106 which causes air to be drawn into the compressor housing 118 through the inlet 122. The air is compressed and then expelled through the outlet 124 toward the intake port 42 of the cylinder 30.

Disposed axially between the compressor wheel 120 and the turbine wheel 110 is a bearing housing 126. The bearing housing 126 defines a bearing chamber 128 for receiving a bearing cartridge 130 that rotatably supports the shaft 106 relative to the bearing housing 126. The bearing chamber 128 is a cylindrical bore coaxial with the shaft 106. The bearing housing 126 also defines a lubricant inlet 140 for feeding lubricant (in this case oil) into the bearing housing 126 to lubricate the bearing cartridge 130 and a lubricant outlet 142 for discharging lubricant from the bearing housing 126. The lubricant inlet 140 is fitted with an inlet tube 144 for connecting the inlet 140 to a lubricant source and the lubricant outlet 142 is fitted with an outlet tube 146 for connecting the outlet 142 to another power plant component to which lubricant can be routed, as will be discussed in more detail further below. The turbine housing 108 is attached to an annular flange 131 (FIGS. 5, 7) of the bearing housing 126 by a clamp 121.

With particular reference to FIGS. 9 to 13, the bearing cartridge 130 includes an inner ring 132 mounted to the shaft 106 and an outer ring 134 disposed between the inner ring 132 and the bearing housing 126. The inner and outer rings 132, 134 extend along an axis 125 that is coincident with the axis 115 of the shaft 106. In order to provide relative motion between the inner and outer rings 132, 134, the bearing cartridge 130 includes a first plurality of rolling elements 136 radially disposed between the inner and outer rings 132, 134 and a second plurality of rolling elements 138 radially disposed between the inner and outer rings 132, 134. The rolling elements 136 are held in place relative to one another by a cage 137. Similarly, the rolling elements 138 are held in place relative to one another by a cage 139. The first and second plurality of rolling elements 136, 138 are axially spaced apart from one another. As the inner and outer rings 132, 134 are radially separated by the rolling elements 136, 138, an inner bearing space 148 (FIG. 13) is defined between the inner and outer rings 132, 134

Figure 13:
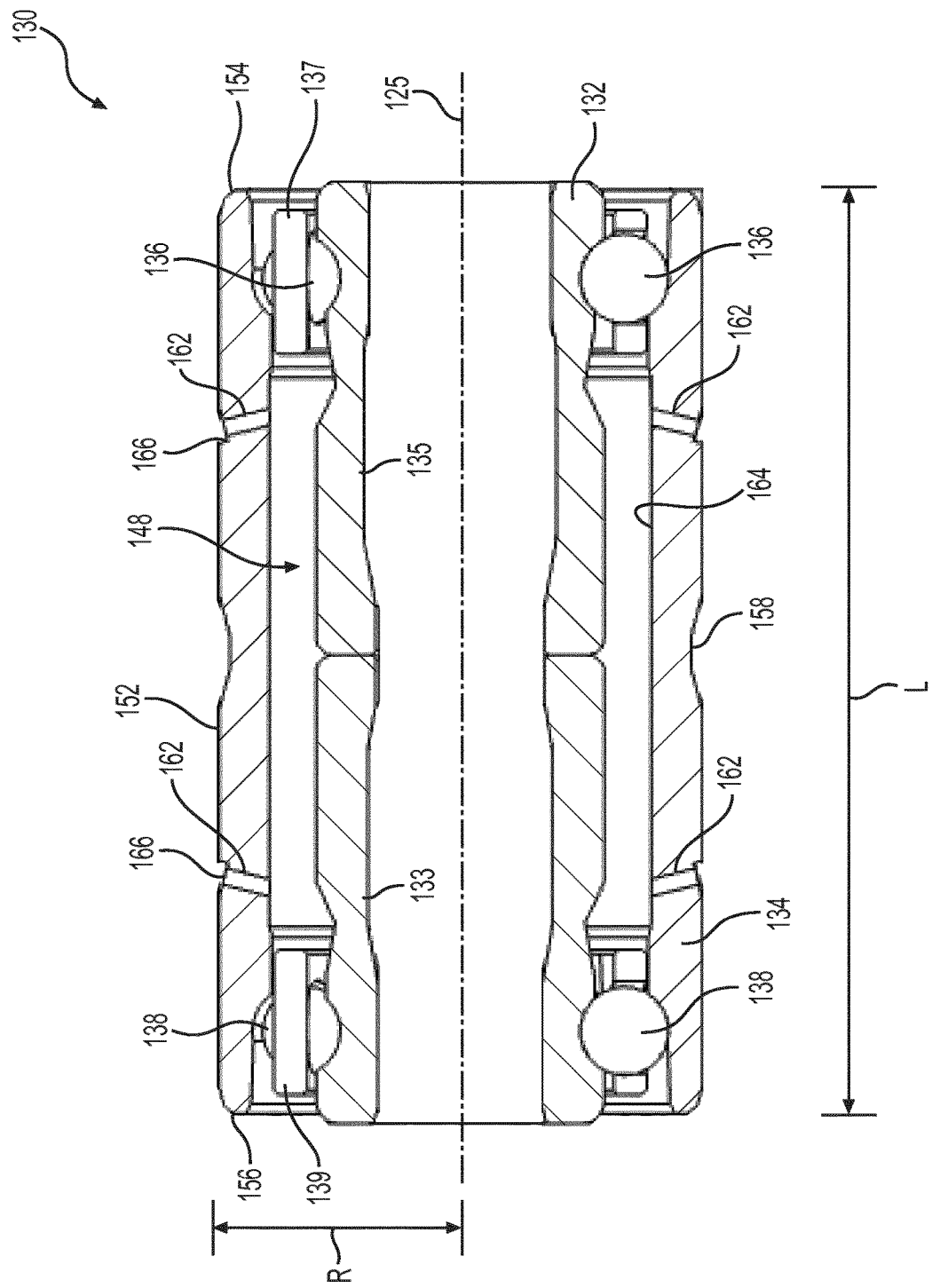
FIG. 13 is a cross-sectional view of the bearing cartridge of FIG. 10 taken along line 13-13 of FIG. 12.

As shown in FIG. 13, the inner ring 132 includes two inner ring parts 133, 135 that are axially adjacent to one another. In this implementation, the two inner ring parts 133, 135 are identical and thus have the same shape and dimensions. The inclusion of two inner ring parts 133, 135 can facilitate the assembly of the bearing cartridge 130 onto the shaft 106.

The outer ring 134 is sized such that a radial gap 150 is defined, radially, between the outer ring 134 and the bearing housing 126. More specifically, as shown in FIG. 13, an outer surface 152 of the outer ring 134 has an outer radius R that is smaller than a radius RBC (FIG. 9) of the bearing chamber 128 of the bearing housing 126. The difference between the radius R of the outer ring 134 and the radius RBC of the bearing chamber 128 results in the radial gap 150 defined between the outer ring 134 and the bearing chamber 128. The lubricant inlet 140 opens into the radial gap 150 in order to feed lubricant therein. In this implementation, the lubricant inlet 140 is located axially between opposite ends 154, 156 of the outer ring 134 and, more specifically, is generally aligned with an axial center of the outer ring 134 (i.e., a midpoint between the ends 154, 156 of the outer ring 134). During operation of the turbocharger 100, lubricant (denoted as 155 in FIG. 16) flows into the radial gap 150 from the lubricant inlet 140 and radially separates the outer ring 134 from the bearing housing 126. The lubricant 155 flowing through and filling the radial gap 150 acts as a thin dampening film which can be helpful to absorb vibrations that occur due to the rotation of the shaft 106, the turbine wheel 110 and the compressor wheel 120. In this implementation, the radial gap 150 extends along a majority of a length L (FIG. 13) of the outer ring 134. More specifically, the radial gap 150 extends along the entirety of the length L of the outer ring 134.

In this implementation, the outer surface 152 of the outer ring 134 defines a radial recess 158 that is aligned with the axial center of the outer ring 134. As such, the radial recess 158 is generally aligned with the lubricant inlet 140. This may facilitate flowing of lubricant into the radial gap 150.

As the outer ring 134 is radially separated from the bearing housing 126 by lubricant circulating in the radial gap 150, the outer ring 134 is movable, and more specifically rotatable, relative to the bearing housing 126. Moreover, as will be described below, the outer ring 134 is axially movable relative to the bearing housing 126 due to axial gaps that are axially adjacent to the outer ring 134.

In a similar manner, the length L of the outer ring 134 is smaller than a length LBC (FIG. 8) of the bearing chamber 128. The difference between the lengths L, LBC of the outer ring 134 and the bearing chamber 128 results in an axial gap 160 defined between the end 154 of the outer ring 134 and the bearing housing 126 and, as will be described in more detail below, an axial gap 190 defined at the end 156 of the outer ring 134. During operation of the turbocharger 100, lubricant flows into the axial gap 160 and axially separates the outer ring 134 from the bearing housing 126. Similarly to the radial gap 150, the lubricant flowing through and filling the axial gap 160 acts as a thin dampening film which can be helpful to absorb vibrations.

Figure 16:
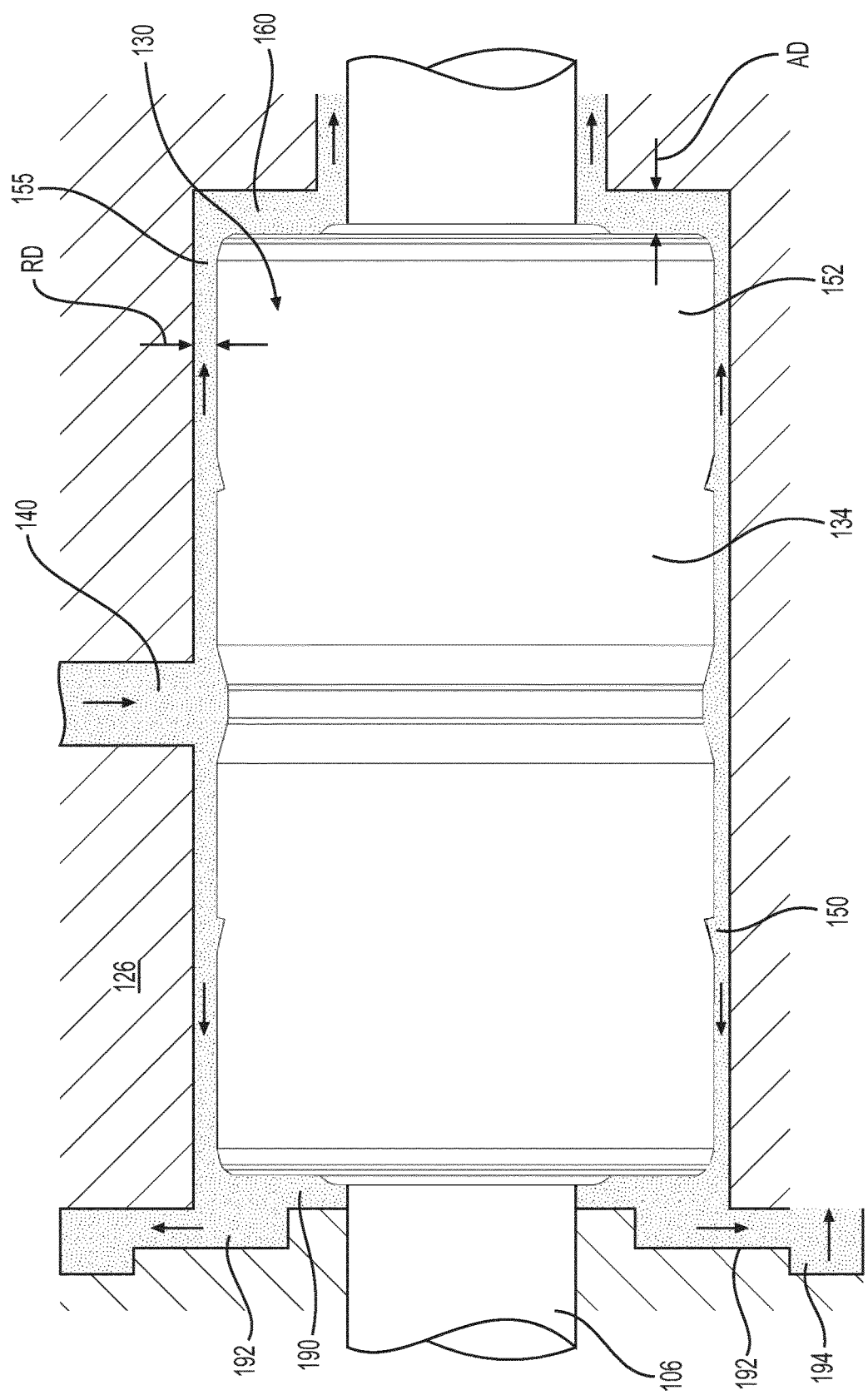
FIG. 16 is cross-sectional view of part of a bearing housing of the turbocharger of FIG. 4, including the bearing cartridge disposed within a bearing chamber of the bearing housing.

As shown in FIG. 16, the radial gap 150 has a radial dimension RD that is substantially equal to an axial dimension AD of the axial gap 160. The radial dimension RD of the radial gap 150 is equal to a difference between a radius RBC of the bearing chamber 128 and the radius R of the outer surface 152 of the outer ring 134. The axial dimension AD of the axial gap 160 is equal to half of a difference between the length LBC of the bearing chamber 128 and the length L of the outer ring 134 when the outer ring 134 is centered relative to the bearing chamber 128. It is understood that the axial dimension AD can increase or decrease as the outer ring 134 moves axially relative to the bearing chamber 128. However, this increase or decrease of the axial dimension AD of the axial gap 160 is compensated by an opposite increase or decrease of an axial dimension of the axial gap 190 as will be explained in more detail below. It is noted that FIG. 16 illustrates the radial and axial gaps 150, 160, 190 with their relative dimensions exaggerated for visual reference.

In order to allow lubricant to flow into the inner bearing space 148 defined between the inner and outer rings 132, 134, the outer ring 134 defines bores 162 that extend from the outer surface 152 to an inner surface 164 (opposite the outer surface 152) of the outer ring 134. As such, lubricant flowing into the radial gap 150 from the lubricant inlet 140 flows into the inner bearing space 148 through the bores 162 and lubricates the first and second plurality of rolling elements 136, 138. In this implementation, the outer ring 134 defines four bores 162. It is contemplated that the outer ring 134 could comprise less or more bores 162 in alternative implementations (e.g., at least one bore 162, five bores 162, etc.)

In this implementation, each bore 162 is located axially between the first and second plurality of rolling elements 136, 138. More specifically, each bore 162 is located axially between the lubricant inlet 140 and one of the first and second plurality of rolling elements 136, 138. For instance, in this example, a given one of the bores 162 is located axially between the lubricant inlet 140 (i.e., the axial center of the outer ring 134) and the first plurality of rolling elements 136 while another one of the bores 162 is located axially between the lubricant inlet 140 (i.e., the axial center of the outer ring 134) and the second plurality of rolling elements 138. In other words, a given one of the bores 162 is located axially between the axial center of the outer ring 134 and the end 154 of the outer ring while another one of the bores 162 is located axially between the axial center of the outer ring 134 and the end 156 of the outer ring 134

To facilitate the flow of lubricant into the bores 162, radial recesses 166 are defined in the outer surface 152 of the outer ring 134. The radial recesses 166 are axially aligned with the bores 162 such that, in this implementation, the outer surface 152 defines one radial recess 166 between the lubricant inlet 140 and the first plurality of rolling elements 136, and another radial recess 166 between the lubricant inlet 140 and the second plurality of rolling elements 138. In other words, the outer surface 152 defines one radial recess 166 between the axial center of the outer ring 134 and the end 154 of the outer ring 134 and another radial recess 166 between the axial center of the housing 134 and the end 154 of the outer ring 134. In this implementation, radial recess 166 is defined in the outer surface 152 for each bore 162. The bores 162 extend from a given one of the radial recesses 166 to the inner surface 164 of the outer ring 134

Figure 8:
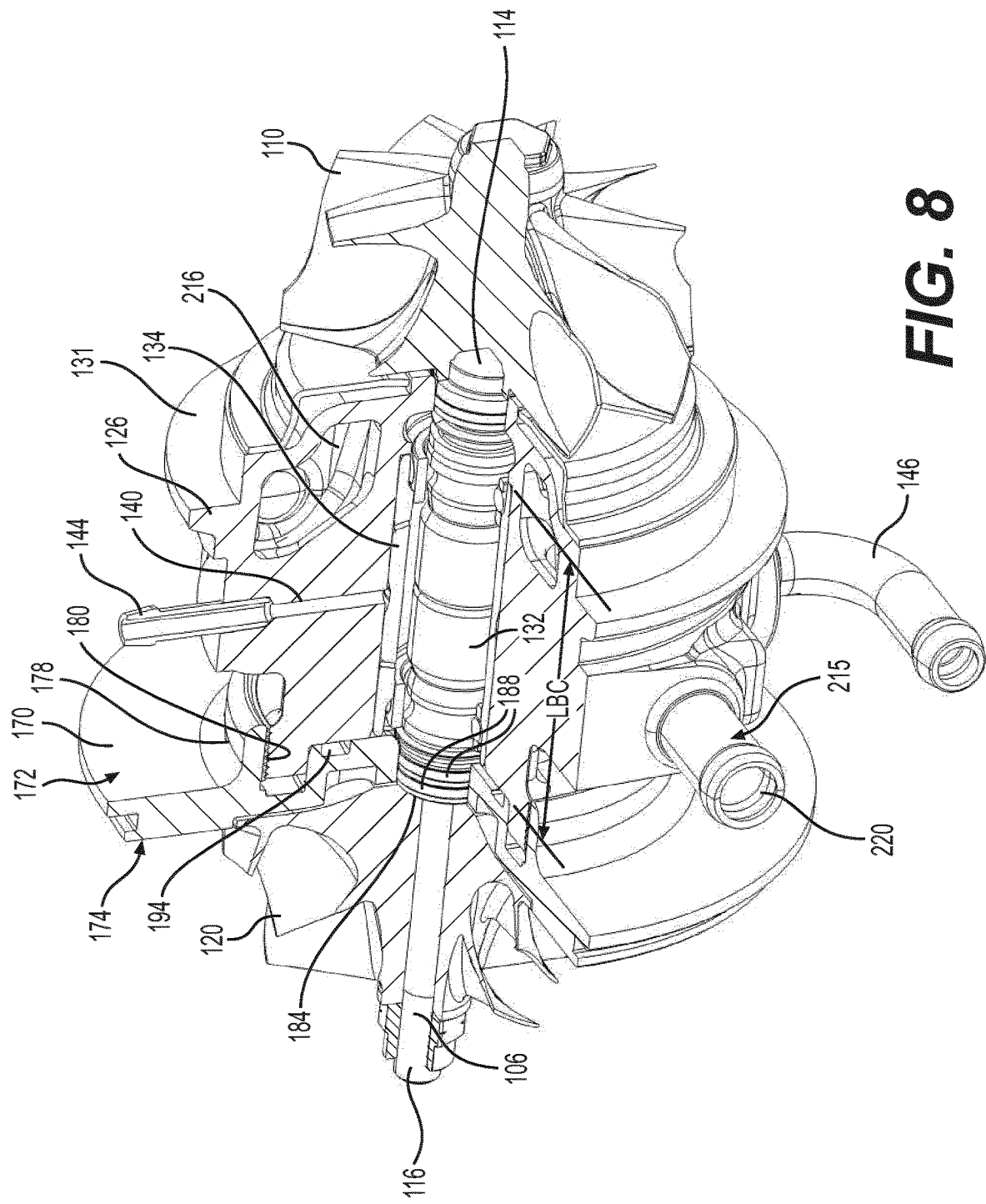
FIG. 8 is a perspective view of part of a cross-section of the turbocharger of FIG. 4 taken along line 8-8 in FIG. 6 with a turbine housing and a compressor housing removed therefrom.
Figure 14:
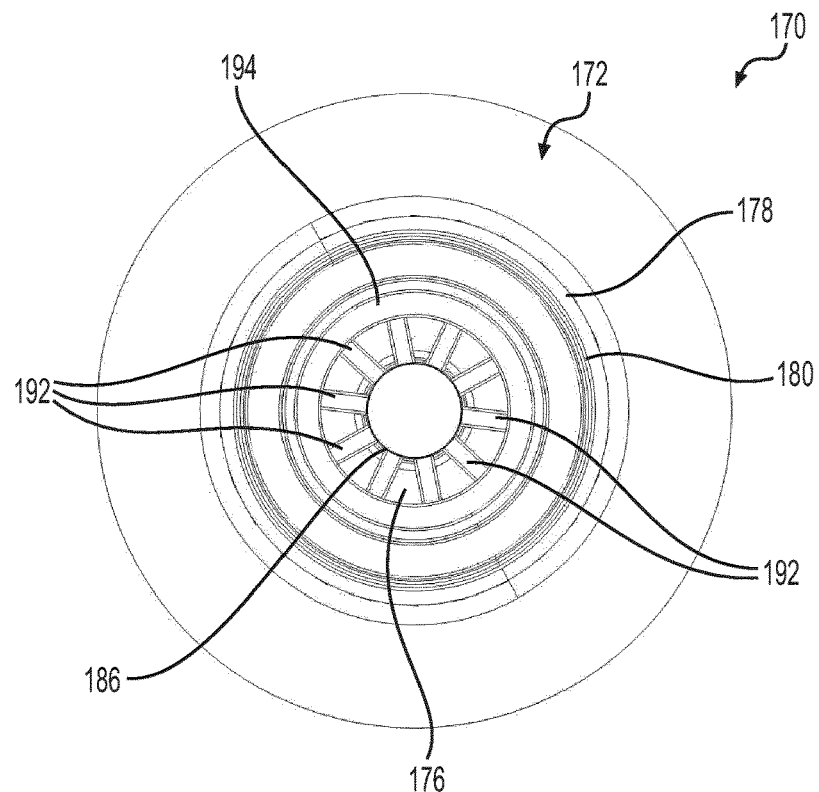
FIG. 14 is a right side elevation view of a compressor backplate of the turbocharger of FIG. 4.

With particular reference to FIGS. 7, 8 and 14, the turbocharger 100 also comprises a compressor backplate 170 for supporting the compressor housing 118. The compressor backplate 170, which is mounted to the bearing housing 126, is disposed axially between the bearing housing 126 and the compressor wheel 120. The compressor backplate 170 has an inner side 172 facing the bearing housing 126 and an outer side 174 facing the compressor wheel 120. The inner side 172 of the compressor backplate 170 closes the bearing chamber 128 such as to enclose the bearing cartridge 130 within the bearing chamber 128.

The compressor backplate 170 is affixed to the bearing housing 126. More specifically, an annular flange 178 on the inner side 172 of the compressor backplate 170 is screwed onto the bearing housing 126. To that end, a radially inner side of the flange 178 has threads 180 for screwing the compressor backplate 170 onto the bearing housing 126. The bearing housing 126 has a corresponding outer annular surface 182 that is threaded to engage the threads 180 of the flange 178. Screwing the compressor backplate 170 to the bearing housing 126 in this manner may facilitate adaptability of the turbocharger 100 to different types of turbine housings. For instance, if a different size of turbine housing 108 is desired, a different size of compressor backplate 170 is installed albeit with the same flange 178 and threads 180.

Figure 17:
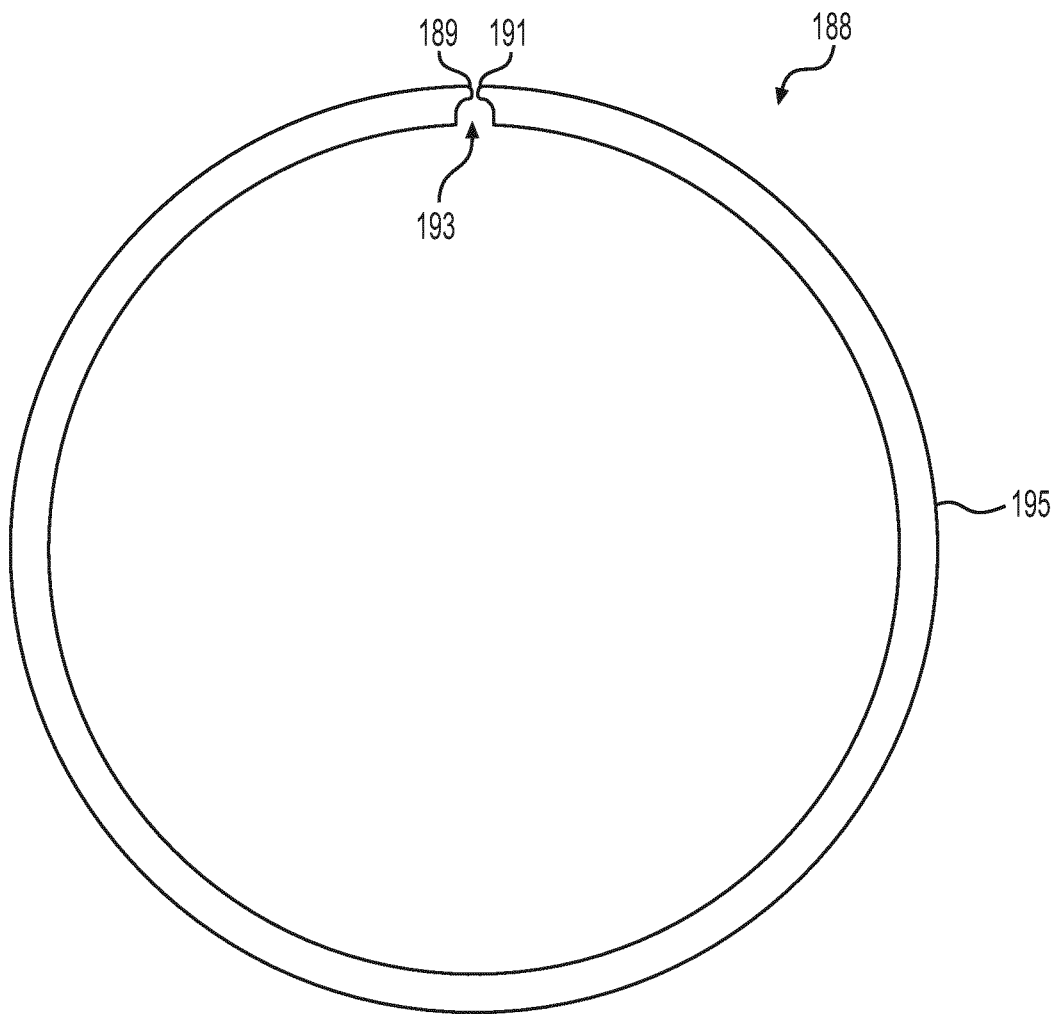
FIG. 17 is a right side elevation view of a sealing ring for the compressor backplate of FIG. 14.

As shown in FIGS. 7 and 8, a sealing carrier 184 is mounted to the shaft 106 (e.g., via a press-fit) and positioned within a central bore 186 of the compressor backplate 170. The sealing carrier 184 is generally cylindrical and defines a pair of radial grooves for receiving therein respective sealing rings 188 that provide a seal between the sealing carrier 184 and the compressor backplate 170 to prevent or otherwise minimize lubricant leaks from the bearing chamber 128. As shown in FIG. 17 for one of the sealing rings 188, the sealing rings 188 are split rings, each sealing ring 188 having two ends 189, 191 defining a gap 193 therebetween. Moreover, each sealing ring 188 has an outer peripheral surface 195 which faces the compressor backplate 170. The sealing rings 188 are tensioned such that the outer peripheral surfaces 195 of the sealing rings 188 are in contact with the central bore 186 of the compressor backplate 170. When the two sealing rings 188 are mounted adjacent to one another on the sealing carrier 184, the sealing rings 188 are positioned such that their respective gaps 193 are circumferentially offset from one another (i.e., unaligned with respect to one another). In one implementation, the sealing rings 188 have a structure identical or similar to a piston ring and can be installed with a piston ring installation tool.

While the axial gap 160 is defined between the end 154 of the outer ring 134 and the bearing housing 126, as shown in FIG. 16, the axial gap 190 is defined between the end 156 of the outer ring 134 and an inner surface 176 on the inner side 172 of the compressor backplate 170. During operation of the turbocharger 100, lubricant flows into the axial gap 190 and axially separates the outer ring 134 from the compressor backplate 170. Thus, the outer ring 134 is axially spaced apart from the bearing housing 126 at the end 154 and from the compressor backplate 170 at the opposite end 156. Similarly to the axial gap 160, the lubricant flowing through and filling the axial gap 190 acts as a thin dampening film which can be helpful to absorb vibrations. The axial gap 190 has the same axial dimension AD as the axial gap 160 when the outer ring 134 is centered relative to the bearing chamber 128 such that the axial dimension AD of the axial gap 190 is substantially equal to the radial dimension RD of the radial gap 150. Notably, the axial dimension AD of the axial gap 190 is equal to half of a difference between the length LBC of the bearing chamber 128 and the length L of the outer ring 134. As previously noted, the axial dimension AD of the axial gap 190 can increase or decrease as the outer ring 134 moves axially relative to the bearing chamber 128.

The compressor backplate 170 defines passages for lubricant to flow from the bearing chamber 128 to the lubricant outlet 142. In particular, as shown in FIG. 14, the inner surface 176 of the compressor backplate 170 defines a plurality of radially-extending passages 192 that extend outwardly from the central bore 186. The radially-extending passages 192 are equally spaced apart from one another and are in line, radially, with the outer ring 134. The inner surface 176 of the compressor backplate 170 also defines an annular passage 194 that is connected to the radially-extending passages 192. As shown in FIG. 8, the radially-extending passages 192 are enclosed, opposite the inner surface 176, by a surface of the bearing housing 126. During operation of the turbocharger 100, lubricant flows from the radial gap 150 and the axial gap 190 into the radially-extending passages 192 and, flowing along a length of the radially-extending passages 192, then flows into the annular passage 194. The bearing housing 126 has a chamfered edge 175 (FIG. 9) to provide a gap between the end 156 of the outer ring 134 and the bearing housing such as to promote lubricant flow to the radially-extending passages 192.

From the annular passage 194 of the compressor backplate 170, lubricant is made to flow back into the bearing housing 126. More particularly, the annular passage 194 opens into a lubricant collecting space 196 defined by the bearing housing 126 and which is configured for collecting lubricant flowing out of the bearing cartridge 130. The lubricant collecting space 196 is axially coextensive with the bearing chamber 128 and is radially separated from the bearing chamber 128 by a wall 198 of the bearing housing 126. The lubricant collecting space 196 is connected to the lubricant outlet 142 and includes an enlarged portion 202 and a reduced portion 204. The enlarged portion 202 opens into the lubricant outlet 142 and extends radially further than the reduced portion 204. This may be helpful to collect lubricant in the enlarged portion 202 and thus discharge lubricant through the lubricant outlet 142 even in scenarios where the turbocharger 100 would be in a slanted position such that the axis 115 of the shaft 106 is not horizontal.

Thus, during operation of the turbocharger 100, after being received in the annular passage 194, lubricant flows into the lubricant collecting space 196 and then into the lubricant outlet 142 and out of the bearing housing 126.

Figure 9:
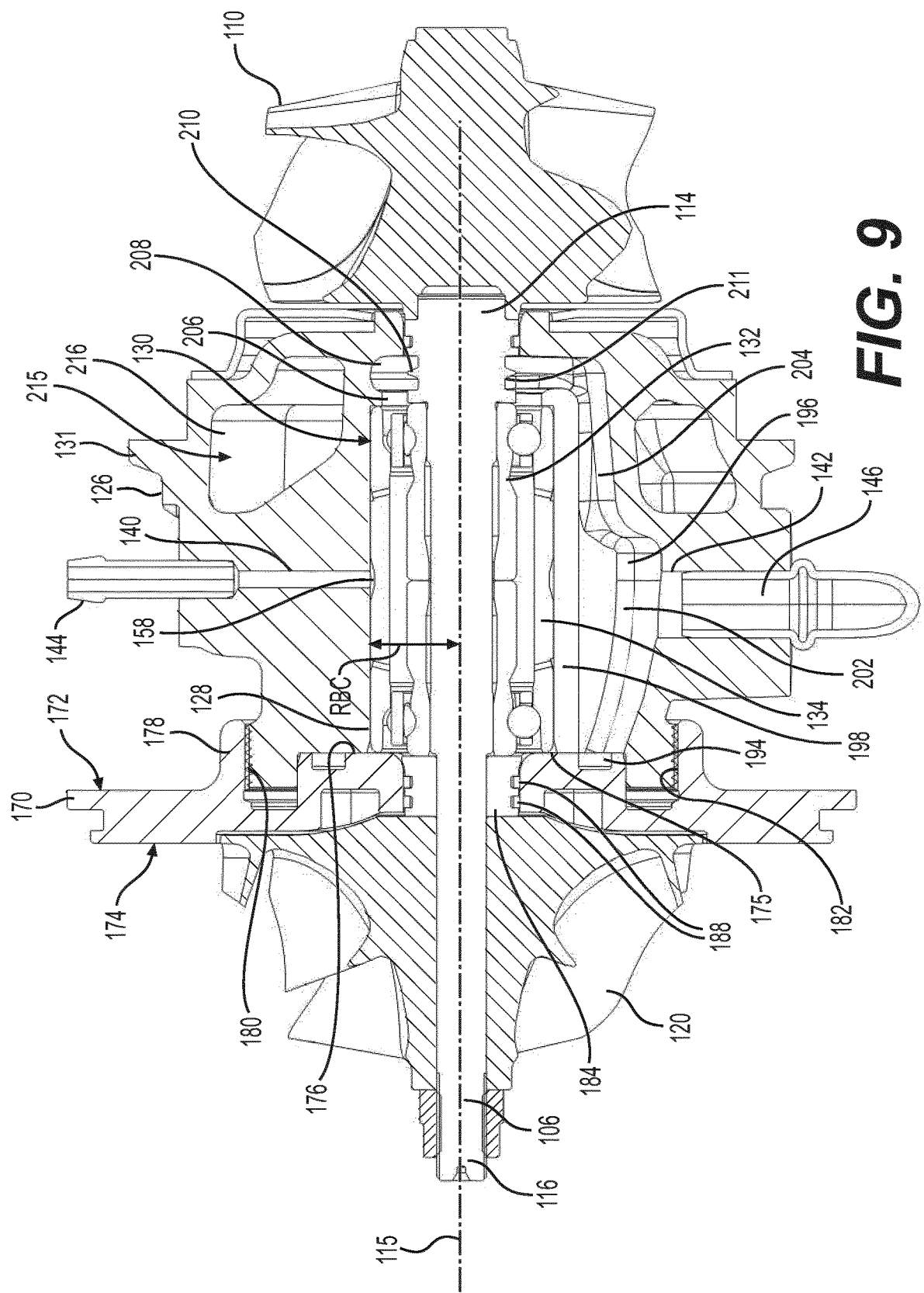
FIG. 9 is cross-sectional view of part of the turbocharger of FIG. 4 taken along line 9-9 in FIG. 5 with the turbine housing and the compressor housing removed therefrom.
Figure 10:
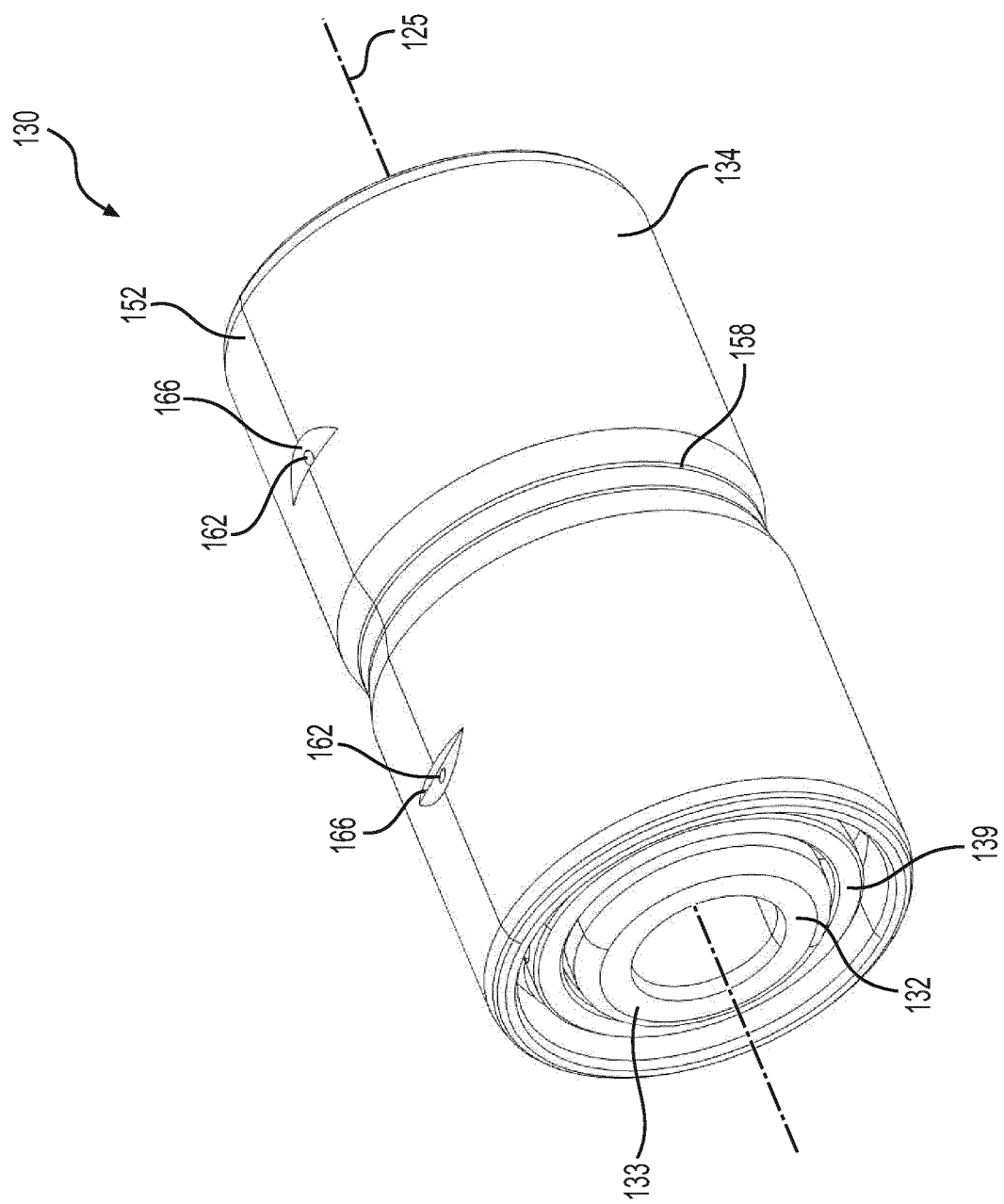
FIG. 10 is a left side perspective view of a bearing cartridge of the turbocharger of FIG. 4.
Figure 11:
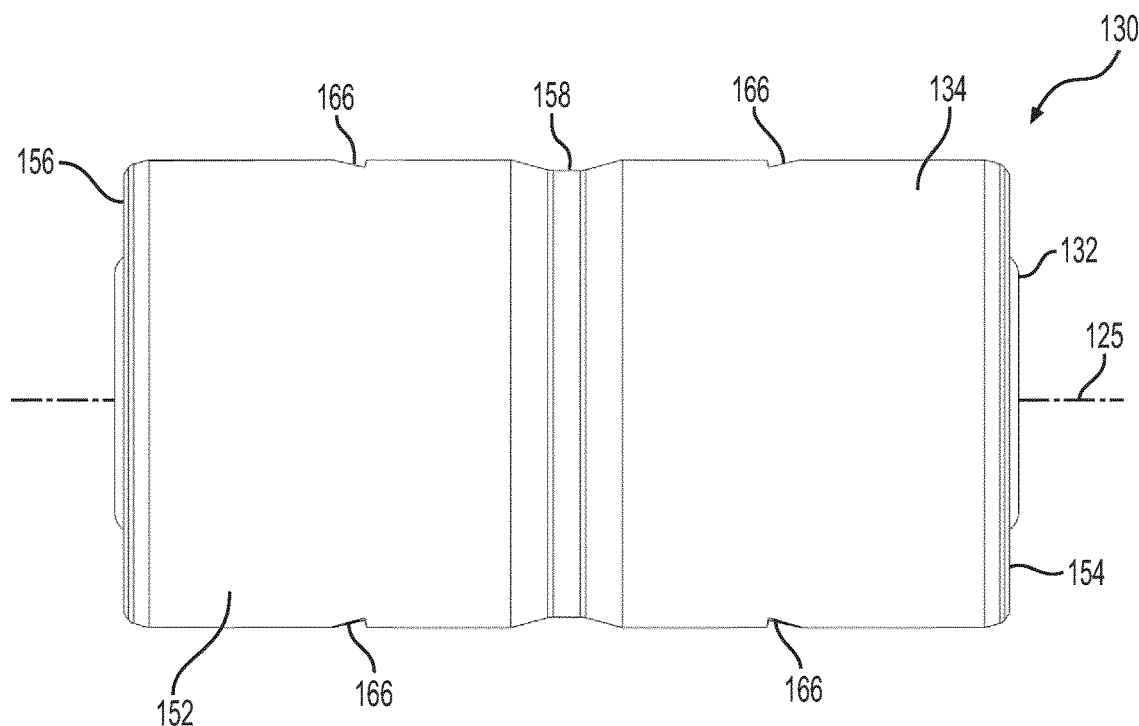
FIG. 11 is a front side elevation view of the bearing cartridge of FIG. 10.
Figure 12:
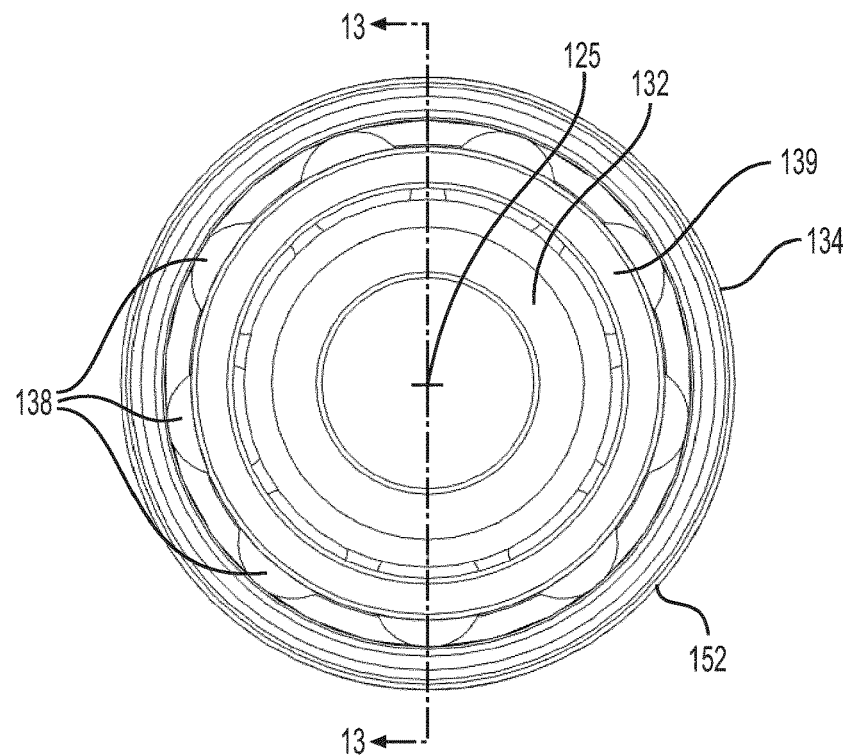
FIG. 12 is a left side elevation view of the bearing cartridge of FIG. 10.

As shown in FIG. 9, at its other end, the bearing chamber 128 opens, through an annular passage 206 defined between the shaft 106 and the bearing housing 126, into an annular cavity 208 defined by the bearing housing 126. The annular cavity 208 is in communication with the reduced portion 204 of the lubricant collecting space 196. Thus, during operation of the turbocharger 100, lubricant flows from the axial gap 160 into the annular cavity 208 and subsequently into the lubricant collecting space 196 and finally into the lubricant outlet 142 where the lubricant flows out of the bearing housing 126. As such, in use, lubricant is discharged from an axial end of the bearing chamber 128 through, on one end, the passages 192, 194 of the compressor backplate 170 and, at the opposite end, through the annular passage 206 and the annular cavity 208. Indeed, it is noted that, in this implementation, the bearing chamber 128 is not connected to any radially-extending outlets for lubricant along the length of the bearing cartridge 130.

In this implementation, the shaft 106 has a projection 210 (FIG. 9) axially positioned within the annular cavity 208 to at least partially project lubricant that flows into the annular cavity 208 against the inner wall of the annular cavity 208. In particular, the projection 210 has a generally conical surface 211 that defines an obtuse angle relative to the axis 115 of the shaft 106. In use, lubricant flowing into the annular cavity 208 from the bearing chamber 128 contacts the conical surface 211 and, due to the elevated rotating speed of the shaft 106, is projected against the inner wall of the annular cavity 208. This may be helpful to direct the flow of lubricant towards the lubricant collecting space 196.

The lubrication system described above allows lubrication of the bearing cartridge 130 with a significantly small flow of lubricant. Notably, in some cases, lubricant flows through the bearing housing 126 at a rate of less than or equal to 2000 cm$^3$ per hour, in some cases at a rate of less than or equal to 200 cm$^3$ per hour, and in some cases even less. For instance, in this example, the lubricant flows through the bearing housing 126 at a rate of 170 cm$^3$ per hour. This is substantially less than in conventional turbochargers and, in particular, compared to turbochargers that implement a ball bearing cartridge which typically require a high amount of lubricant flow. Furthermore, the lubricant flowing into the bearing housing 126 has a relatively low pressure. In particular, the lubricant flowing through the housing 126 has a pressure of less than or equal to 1 bar. For instance, in this example, the pressure of the lubricant flowing through the bearing housing 126 is between 0.3 bar and 0.8 bar. In some cases, the pressure of the lubricant flowing through the housing 126 is less than or equal to 0.1 bar.

Figure 15:
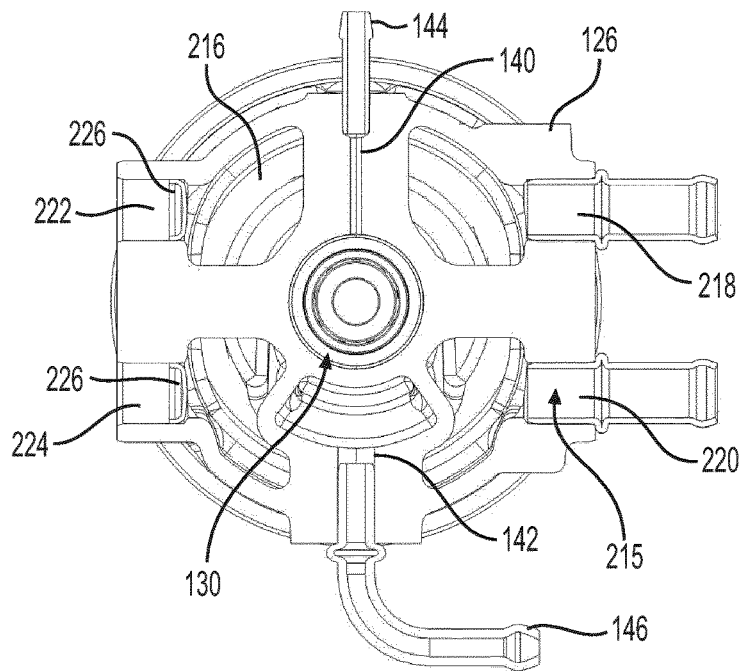
FIG. 15 is a cross-sectional view of the turbocharger of FIG. 4 taken along line 15-15 in FIG. 5 with the turbine housing removed therefrom.

With reference to FIGS. 7, 8 and 15, the turbocharger 100 comprises a cooling system 215 for cooling the turbocharger 100 and, in particular, the bearing housing 126. The cooling system 215 includes a coolant chamber 216 defined in the housing 126 and through which coolant circulates. The cooling system 215 also includes a plurality of ports 218, 220, 222, 224 in fluid communication with the coolant chamber 216. In this implementation, the port 218 is an inlet port for feeding coolant into the coolant chamber 216, the port 220 is an outlet port for discharging coolant from the coolant chamber 216, and the remaining ports 222, 224 are blocked via plugs 226 positioned in the ports 222, 224. Any one of the ports 218, 220, 222, 224 can be made the inlet port or the outlet port in alternative implementations. Notably, any two of the four ports 218, 220, 222, 224 can be selectively blocked by the plugs 226 while any other two of the four ports 218, 220, 222, 224 can be used as the inlet and outlet ports of the cooling system 215. This provides more options as to the location of the coolant inlet and outlet of the bearing housing 126 which may facilitate positioning of the turbocharger 100 within the power plant 5. It is contemplated that the cooling system 215 could comprise less or more ports (e.g., three ports, five ports, etc.) in alternative implementations.

As will now be explained in more detail, in this implementation, lubricant that flows through the bearing housing 126 is pumped thereto from other components of the engine 10 and, after flowing through the bearing housing 126, is routed through other components of the engine 10 thereafter.

Figure 18:
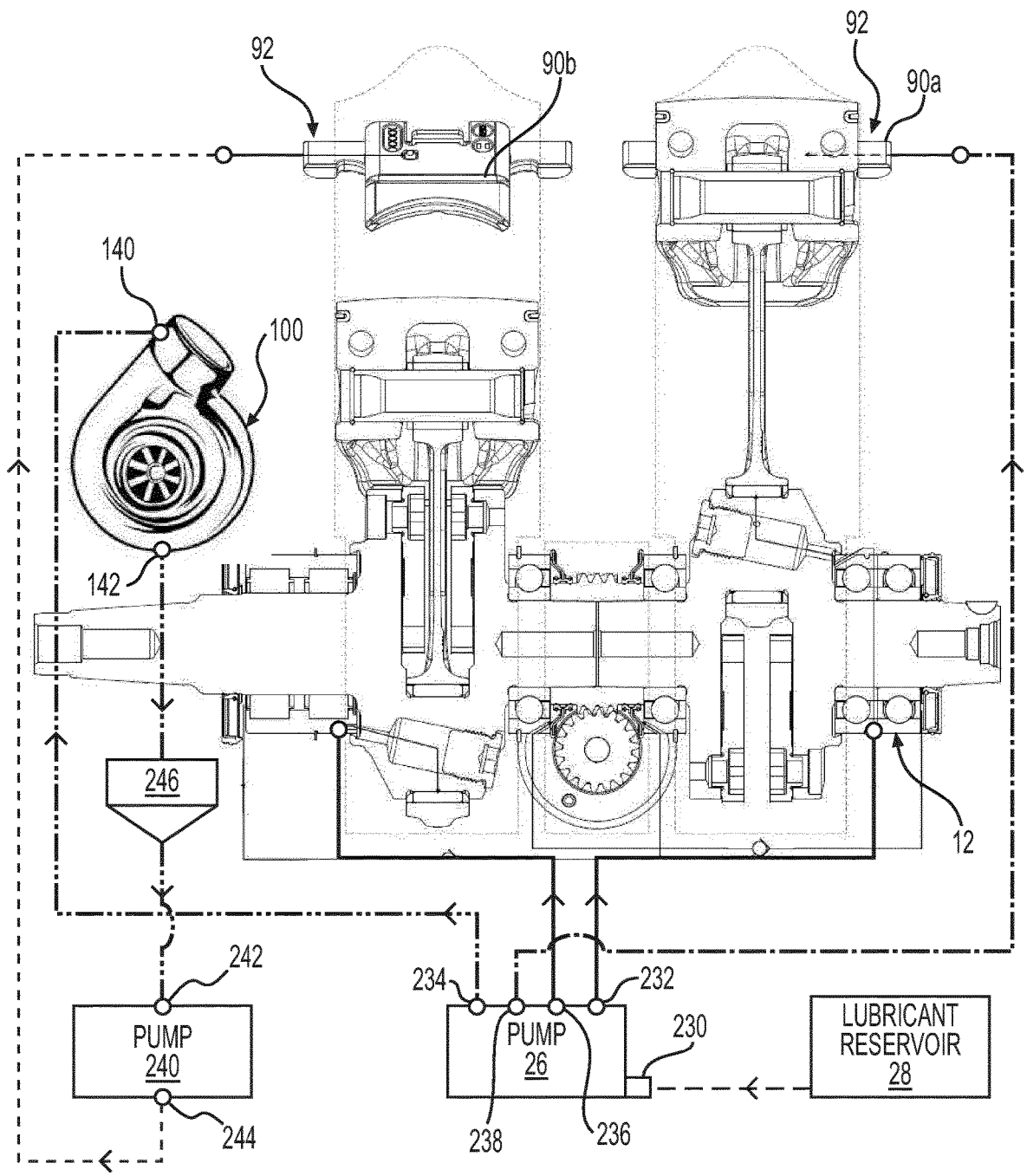
FIG. 18 is a schematic representation of a flow of lubricant to and from the turbocharger and the engine.

To that end, with reference to FIG. 18, the oil pump 26 is fluidly connected to the lubricant reservoir 28, the crankcase 12, and the turbocharger 100 such as to pump lubricant from the lubricant reservoir 28 to the crankcase 12, to one of the exhaust valves 90a, 90b, and to the turbocharger 100. More specifically, the oil pump 26 has an inlet port 230 for receiving lubricant from the lubricant reservoir 28, an outlet port 232 for feeding lubricant from the oil pump 26 to the crankcase 12 (and more specifically to a bearing supporting the crankshaft 18), an outlet port 238 for feeding lubricant to the exhaust valve 90a and an outlet port 234 for feeding lubricant from the oil pump 26 to the turbocharger 100. As previously described, the lubricant enters the turbocharger 100 through the lubricant inlet 140 of the bearing housing 126. In this implementation, the oil pump 26 also has an additional outlet port 236 for feeding lubricant to the bearings supporting the crankshaft 18 in the crankcase 12 (e.g., such that the oil pump 26 is connected to two inlets of the crankcase 12).

The power plant 5 also includes another lubricant (oil) pump 240 that is fluidly connected to the turbocharger 100 and the exhaust valve 90b for pumping lubricant from the turbocharger 100 to the exhaust valve 90b. More specifically, a reservoir 246 is connected to the turbocharger 100 which receives lubricant flowing out of the turbocharger 100 through the lubricant outlet 142 and the outlet tube 146. In this implementation, the volume of the reservoir 246 is approximately 100 cc, but it is contemplated that the volume could be more or less than 100 cc. The reservoir 246 is fluidly connected to the airbox 252 to vent the reservoir 246 such as to discharge any air contained in the lubricant to the airbox 252. The oil pump 240 has an inlet port 242 for receiving lubricant from the reservoir 246 and an outlet port 244 for feeding lubricant from the oil pump 240 to the exhaust valve 90b. It is contemplated that the oil pump 240 could pump lubricant to both exhaust valves 90a, 90b. It is further contemplated that the oil pump 26 could pump lubricant to both exhaust valves 90a, 90b, or the oil pump 26 could not pump lubricant to the exhaust valves 90a, 90b.

Figure 19:
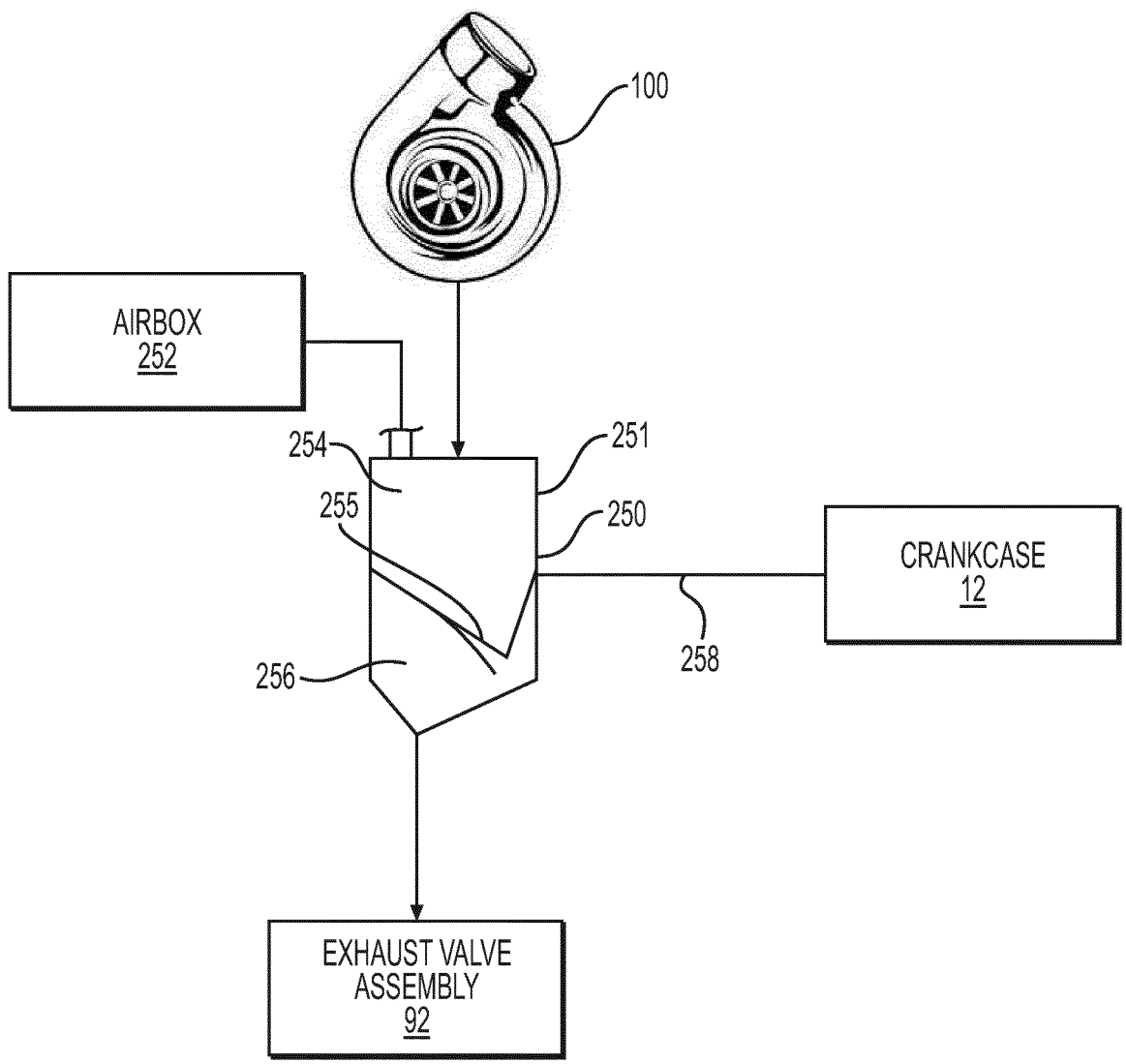
FIG. 19 is a schematic representation of a pump of the power plant in accordance with an alternative implementation.

In an alternative implementation, as shown in FIG. 19, the oil pump 240 and the reservoir 246 are replaced by an oil pump that comprises a reed valve 250. The reed valve 250 comprises a reservoir 251 including an upper chamber 254 and a lower chamber 256 separated by a membrane 255 (i.e., a reed petal). The lower chamber 256 of the reed valve 250 is fluidly connected to the crankcase 12 via pressure feed line 258. The upper chamber 254 of the reed valve 250 is fluidly connected to the turbocharger 100 via the lubricant outlet 142 and the outlet tube 146, and to an airbox 252 of the engine 10 configured to collect air. The reed valve 250 is fluidly connected to the airbox 252 to vent the reservoir 251 such as to discharge any air contained in the lubricant to the airbox 252 and/or to release extra pressure thereto. During operation of the engine 10, pressure pulsations generated within the crankcase 12 cause the reed valve 250 to open and close such as to pump lubricant to the exhaust valve assembly 92. Notably, as the piston 34 rises in the cylinder 30, a vacuum is created in the portion of the crankcase 12 beneath the piston 34. A resulting pressure differential causes movement of the reed petal 255 thus opening the reed valve 250 to allow lubricant received from the turbocharger 100 to pass from the upper chamber 254 to the lower chamber 256 which is fluidly connected to the exhaust valve assembly 92 to feed the lubricant thereto.

The power plant 5 of the vehicle implemented in accordance with some non-limiting implementations of the present technology can be represented as presented in the following numbered clauses.

CLAUSE 1. A turbocharger (100) for an engine (10), comprising: a housing (126); a shaft (106) having a first end (114) and a second end (116) opposite the first end (114); a turbine wheel (110) mounted to the first end (114) of the shaft (106) for rotation therewith; a compressor wheel (120) mounted to the second end (116) of the shaft (106) for rotation therewith, the housing (126) being positioned axially between the turbine wheel (110) and the compressor wheel (120); and a bearing cartridge (130) rotatably supporting the shaft (106) relative to the housing (126), the bearing cartridge (130) comprising: an inner ring (132) mounted to the shaft (106); an outer ring (134) disposed between the inner ring (132) and the housing (126), the outer ring (134) being movable relative to the housing (126); a first plurality of roller elements (136) disposed radially between the inner and outer rings (132, 134) and rotatably supporting the inner ring (132) relative to the outer ring (134); and a second plurality of roller elements (138) disposed radially between the inner and outer rings (132, 134) and rotatably supporting the inner ring (132) relative to the outer ring (134), the second plurality of roller elements (138) being axially spaced apart from the first plurality of roller elements (136), a radial gap (150) being defined between the outer ring (134) and the housing (126), lubricant (155) flowing into the radial gap (150) and radially separating the outer ring (134) from the housing (126) during operation of the turbocharger (100).

CLAUSE 2. The turbocharger of clause 1, wherein the outer ring (134) is rotatable relative to the housing (126).

CLAUSE 3. The turbocharger of clause 1 or 2, wherein: the housing (126) defines a lubricant inlet (140) for feeding lubricant (155) into the housing (126) and a lubricant outlet (142) for discharging lubricant (155) from the housing (126); and the lubricant inlet (140) opens into the radial gap (150).

CLAUSE 4. The turbocharger of clause 3, wherein: the outer ring (134) has a first end (154) and a second end (156) opposite the first end (154); the lubricant inlet (140) is located axially between the first and second ends of the outer ring (134).

CLAUSE 5. The turbocharger of clause 4, wherein the lubricant inlet (140) is generally aligned with an axial center of the outer ring (134).

CLAUSE 6. The turbocharger of any one of clauses 3 to 5, wherein: the outer ring (134) has an inner surface (164) facing the inner ring (132) and an outer surface (152) opposite the inner surface (164); the outer surface (152) of the outer ring (134) defines a radial recess (158); and the radial recess (158) is generally aligned with the lubricant inlet (140).

CLAUSE 7. The turbocharger of any one of clauses 1 to 5, wherein: an axial gap (160) is defined between an end (154) of the outer ring (134) and the housing (126); and during operation of the turbocharger (100), lubricant (155) flows into the axial gap (160) and axially separates the end (154) of the outer ring (134) from the housing (126).

CLAUSE 8. The turbocharger of clause 7, wherein: the housing (126) defines a bearing chamber (128); the outer ring (134) has an inner surface (164) facing the inner ring (132) and an outer surface (152) opposite the inner surface (164); the bearing cartridge (130) is disposed within the bearing chamber (128) of the housing (126); a radial dimension (RD) of the radial gap (150) is equal to a difference between a radius (RBC) of the bearing chamber (128) and a radius (R) of the outer surface (152) of the outer ring (134); an axial dimension (AD) of the axial gap (160) is equal to half of a difference between a length (LBC) of the bearing chamber (128) and a length of the outer ring (134); and the radial dimension (RD) of the radial gap (150) is substantially equal to the axial dimension (AD) of the axial gap (160).

CLAUSE 9. The turbocharger of clause 7, further comprising a compressor backplate (170) disposed axially between the housing (126) and the compressor wheel (120), wherein: the axial gap (160) is a first axial gap; a second axial gap (190) is defined between the outer ring (134) and the compressor backplate (170); and during operation of the turbocharger (100), lubricant (155) flows into the second axial gap (190) and axially separates the outer ring (134) from the compressor backplate (170).

CLAUSE 10. The turbocharger of clause 9, wherein the compressor backplate (170) is screwed onto the housing (126).

CLAUSE 11. The turbocharger of clause 9 or 10, wherein: the compressor backplate (170) defines a plurality of radially-extending passages (192) and an annular passage (194) connected to the radially-extending passages (192); and during operation of the turbocharger (100), lubricant (155) flows from the radial gap (150) into the radially-extending passages (192) and into the annular passage (194).

CLAUSE 12. The turbocharger of clause 11, wherein: the housing (126) defines a lubricant collecting space (196) for collecting lubricant (155) flowing out of the bearing cartridge (130); and during operation of the turbocharger (100), lubricant (155) flows from the annular passage (194) of the compressor backplate (170) into the lubricant collecting space (196).

CLAUSE 13. The turbocharger of clause 12, wherein: the lubricant collecting space (196) is connected to the lubricant outlet (142); and during operation of the turbocharger (100), lubricant (155) flows from the lubricant collecting space (196) through the lubricant outlet (142) to flow out of the housing (126).

CLAUSE 14. The turbocharger of clause 3, wherein: an inner bearing space (148) is defined between the outer ring (134) and the inner ring (132); the outer ring (134) has an inner surface (164) facing the inner ring (132) and an outer surface (152) opposite the inner surface (164); the outer ring (134) defines at least one bore (162) extending from the outer surface (152) to the inner surface (164) of the outer ring (134); and during operation of the turbocharger (100), lubricant flows from the radial gap (150) into the inner bearing space (148) through the at least one bore (162) of the outer ring (134).

CLAUSE 15. The turbocharger of clause 14, wherein the at least one bore (162) of the outer ring (134) is located axially between the first and second plurality of roller elements (136, 138).

CLAUSE 16. The turbocharger of clause 14 or 15, wherein the at least one bore (162) of the outer ring (134) is located axially between the lubricant inlet (140) and one of the first and second pluralities of roller elements (136, 138).

CLAUSE 17. The turbocharger of clause 16, wherein: the at least one bore (162) includes a first bore and a second bore; the first bore (162) is located axially between the lubricant inlet (140) and the first plurality of roller elements (136) and the second bore (162) is located axially between the lubricant inlet (140) and the second plurality of roller elements (138).

CLAUSE 18. The turbocharger of any one of clauses 14 to 16, wherein the at least one bore (162) is at least four bores.

CLAUSE 19. The turbocharger of any one of clauses 14 to 18, wherein the outer surface (152) of the outer ring (134) defines a radial recess (166), the at least one bore (162) of the outer ring (134) extending from the radial recess (166) to the inner surface (164) of the outer ring (134).

CLAUSE 20. The turbocharger of any one of clauses 1 to 7 and 9 to 14, wherein: the housing (126) defines a bearing chamber (128) containing the bearing cartridge (130); and the lubricant (155) is discharged from an axial end of the bearing chamber (128).

CLAUSE 21. The turbocharger of any one of clauses 1 to 20, wherein, during operation of the turbocharger (100), lubricant (155) flows through the housing (126) at a rate of less than or equal to 2000 cm$^3$ per hour.

CLAUSE 22. The turbocharger of any one of clauses 1 to 21, wherein, during operation of the turbocharger (100), lubricant (155) flowing through the housing (126) has a pressure of less than or equal to 1 bar.

CLAUSE 23. The turbocharger of any one of clauses 1 to 22, further comprising a cooling system (215), the cooling system (215) comprising: a coolant chamber (216) defined in the housing (126); and first, second and third ports (218, 220, 222) fluidly communicating with the coolant chamber (216), wherein: the first port (218) is an inlet port for feeding coolant into the coolant chamber (216); the second port (220) is an outlet port for discharging coolant from the coolant chamber (216); and the third port (222) is blocked.

CLAUSE 24. The turbocharger of any one of clauses 1 to 7 and 9 to 23, wherein the radial gap (150) extends along a majority of a length (L) of the outer ring (134).

CLAUSE 25. The turbocharger of clause 24, wherein the radial gap (150) extends along an entirety of the length (L) of the outer ring (134).

CLAUSE 26. The turbocharger of any one of clauses 1 to 25, wherein the inner ring (132) includes two inner ring parts (133, 135) axially adjacent to one another.

CLAUSE 27. A vehicle power plant (5) comprising: an internal combustion engine (10), comprising: a crankcase (12); a crankshaft (18) disposed at least in part in the crankcase (12); a cylinder block (14) connected to the crankcase (12), the cylinder block (14) defining a cylinder (30) having a cylinder axis (32), the cylinder (30) defining at least one exhaust port (52) for discharging exhaust fluid from the cylinder (30) and at least one intake port (42) for receiving air into the cylinder (30); a piston (34) movably disposed within the cylinder (30) and being operatively connected to the crankshaft (18), the piston (34) being movable along the cylinder axis (32) in a reciprocating motion; an exhaust valve assembly (92) for selectively opening and at least partially closing the at least one exhaust port (52); and a lubricant reservoir (28) for containing lubricant; a turbocharger (100) fluidly communicating with the at least one intake port (42) and the at least one exhaust port (52); a first pump (26) fluidly connected to the lubricant reservoir (28), the crankcase (12), and the turbocharger (100) for pumping lubricant from the lubricant reservoir (128) to the crankcase (12) and to the turbocharger (100); and a second pump (240) fluidly connected to the turbocharger (100) and the exhaust valve assembly (92) for pumping lubricant from the turbocharger (100) to the exhaust valve assembly (92).

CLAUSE 28. The power plant of clause 27, wherein the first pump (26) includes: at least one inlet port (230) for receiving lubricant from the lubricant reservoir (28); at least one first outlet port (232) for feeding lubricant from the first pump (26) to the crankcase (12); and at least one second outlet port (234) for feeding lubricant from the first pump (26) to the turbocharger (100).

CLAUSE 29. The power plant of clause 27 or 28, wherein: the second pump (240) comprises a reed valve (250) fluidly connected to the crankcase (12); during operation of the engine (10), pressure pulsations generated within the crankcase (12) cause the reed valve (250) to open and close such as to pump lubricant to the exhaust valve assembly (92).

CLAUSE 30. A turbocharger (100) for an engine (10), comprising: a housing (126) defining a lubricant inlet (140), a lubricant outlet (142) and a bearing chamber (128); a shaft (106) having a first end (114) and a second end (116) opposite the first end (114); a turbine wheel (110) mounted to the first end (114) of the shaft (106) for rotation therewith; a compressor wheel (120) mounted to the second end (116) of the shaft (106) for rotation therewith, the housing (126) being positioned axially between the turbine wheel (110) and the compressor wheel (120); and a bearing cartridge (130) disposed in the bearing chamber (128) of the housing (126) and rotatably supporting the shaft (106) relative to the housing (126), the bearing cartridge (130) comprising: an inner ring (132) mounted to the shaft (106); an outer ring (134) disposed between the inner ring (132) and the housing (126), the outer ring (134) being movable relative to the housing (126); a first plurality of roller elements (136) disposed radially between the inner and outer rings (132, 134) and rotatably supporting the inner ring (132) relative to the outer ring (134); and a second plurality of roller elements (138) disposed radially between the inner and outer rings (132, 134) and rotatably supporting the inner ring (132) relative to the outer ring (134), the second plurality of roller elements (138) being axially spaced apart from the first plurality of roller elements (136), a radius (R) of the outer ring (134) being smaller than a radius (RBC) of the bearing chamber (128) of the housing (126) such that a radial gap (150) is defined between the outer ring (134) and the bearing chamber (128), the lubricant inlet (140) and the lubricant outlet (142) being in fluid communication with the radial gap (150).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A turbocharger for an engine, comprising:
a housing;
a shaft having a first end and a second end opposite the first end;
a turbine wheel mounted to the first end of the shaft for rotation therewith;
a compressor wheel mounted to the second end of the shaft for rotation therewith, the housing being positioned axially between the turbine wheel and the compressor wheel; and
a bearing cartridge rotatably supporting the shaft relative to the housing, the bearing cartridge comprising:
an inner ring mounted to the shaft;
an outer ring disposed between the inner ring and the housing, the outer ring being movable relative to the housing, the outer ring having a first end facing toward the turbine wheel and a second end facing toward the compressor wheel, the outer ring being rotatable relative to the housing;
a first plurality of rolling elements disposed radially between the inner and outer rings and rotatably supporting the inner ring relative to the outer ring; and
a second plurality of rolling elements disposed radially between the inner and outer rings and rotatably supporting the inner ring relative to the outer ring, the second plurality of rolling elements being axially spaced apart from the first plurality of rolling elements;
a radial gap being defined between the outer ring and the housing, lubricant flowing into the radial gap and radially separating the outer ring from the housing during operation of the turbocharger;
an axial gap being defined between the first end of the outer ring and the housing, the lubricant flowing into the axial gap and axially separating the first end of the outer ring from the housing during operation of the turbocharger.

2. The turbocharger of claim 1, wherein:
the housing defines a lubricant inlet for feeding the lubricant into the housing and a lubricant outlet for discharging the lubricant from the housing; and
the lubricant inlet opens into the radial gap.

3. The turbocharger of claim 2, wherein:
the outer ring has an inner surface facing the inner ring and an outer surface opposite the inner surface;
the outer surface of the outer ring defines a radial recess; and
the radial recess is generally aligned with the lubricant inlet.

4. The turbocharger of claim 1, wherein:
the housing defines a bearing chamber;
the outer ring has an inner surface facing the inner ring and an outer surface opposite the inner surface;
the bearing cartridge is disposed within the bearing chamber of the housing;

a radial dimension of the radial gap is equal to a difference between a radius of the bearing chamber and a radius of the outer surface of the outer ring;

an axial dimension of the axial gap is equal to half of a difference between a length of the bearing chamber and a length of the outer ring; and the radial dimension of the radial gap is equal to the axial dimension of the axial gap.

5. The turbocharger of claim 1, further comprising a compressor backplate disposed axially between the housing and the compressor wheel, wherein:

the axial gap is a first axial gap;

a second axial gap is defined between the second end of the outer ring and the compressor backplate; and during operation of the turbocharger, the lubricant flows into the second axial gap and axially separates the second end of the outer ring from the compressor backplate.

6. The turbocharger of claim 5, wherein:

the compressor backplate defines a plurality of radially-extending passages and an annular passage connected to the plurality of radially-extending passages; and during operation of the turbocharger, the lubricant flows from the radial gap into the radially-extending passages and into the annular passage.

7. The turbocharger of claim 6, wherein:

the housing defines a lubricant collecting space for collecting the lubricant flowing out of the bearing cartridge; and during operation of the turbocharger, the lubricant flows from the annular passage of the compressor backplate into the lubricant collecting space.

8. The turbocharger of claim 7, wherein:

the lubricant collecting space is connected to the lubricant outlet; and during operation of the turbocharger, the lubricant flows from the lubricant collecting space through the lubricant outlet to flow out of the housing.

9. The turbocharger of claim 1, wherein:

the housing defines a lubricant inlet for feeding the lubricant into the housing and a lubricant outlet for discharging the lubricant from the housing, the lubricant inlet opening into the radial gap;

an inner bearing space is defined between the outer ring and the inner ring;

the outer ring has an inner surface facing the inner ring and an outer surface opposite the inner surface;

the outer ring defines at least one bore extending from the outer surface to the inner surface of the outer ring; and during operation of the turbocharger, the lubricant flows from the radial gap into the inner bearing space through the at least one bore of the outer ring.

10. The turbocharger of claim 9, wherein the at least one bore of the outer ring is located axially between the lubricant inlet and one of the first and second pluralities of rolling elements.

11. The turbocharger of claim 10, wherein:

the at least one bore includes a first bore and a second bore;

the first bore is located axially between the lubricant inlet and the first plurality of rolling elements and the second bore is located axially between the lubricant inlet and the second plurality of rolling elements.

12. The turbocharger of claim 10, wherein:

the outer surface of the outer ring defines a radial recess generally aligned with the lubricant inlet; and the at least one bore is axially spaced from the radial recess.

13. The turbocharger of claim 9, wherein the at least one bore is at least four bores.

14. The turbocharger of claim 9, wherein the outer surface of the outer ring defines a radial recess, the at least one bore of the outer ring extending from the radial recess to the inner surface of the outer ring.

15. The turbocharger of claim 1, wherein, during operation of the turbocharger, the lubricant flows through the housing at a rate of less than or equal to 2000 cm$^3$ per hour.

16. The turbocharger of claim 1, wherein, during operation of the turbocharger, lubricant flowing through the housing has a pressure of less than or equal to 1 bar.

17. The turbocharger of claim 1, wherein the radial gap extends along a majority of a length of the outer ring.

18. The turbocharger of claim 1, wherein the inner ring includes two inner ring parts axially adjacent to one another.

19. The turbocharger of claim 1, wherein:

the housing defines a lubricant inlet, a lubricant outlet and a bearing chamber;

the bearing cartridge is disposed in the bearing chamber of the housing;

an inner bearing space is defined between the outer ring and the inner ring of the bearing cartridge;

the outer ring has an inner surface facing the inner ring and an outer surface opposite the inner surface, the outer ring defining at least one bore extending from the outer surface to the inner surface of the outer ring;

a radius of the outer ring is smaller than a radius of the bearing chamber of the housing such that the radial gap is defined between the outer ring and the bearing chamber, the lubricant inlet and the lubricant outlet being in fluid communication with the radial gap; and during operation of the turbocharger, the lubricant flows from the radial gap into the inner bearing space through the at least one bore of the outer ring.

20. A turbocharger for an engine, comprising:

a housing;

a shaft having a first end and a second end opposite the first end;

a turbine wheel mounted to the first end of the shaft for rotation therewith;

a compressor wheel mounted to the second end of the shaft for rotation therewith, the housing being positioned axially between the turbine wheel and the compressor wheel;

a compressor backplate disposed axially between the housing and the compressor wheel, the compressor backplate defining a plurality of radially-extending passages and an annular passage connected to the radially-extending passages; and a bearing cartridge rotatably supporting the shaft relative to the housing, the bearing cartridge comprising:

an inner ring mounted to the shaft;

an outer ring disposed between the inner ring and the housing, the outer ring being movable relative to the housing, the outer ring having a first end facing toward the turbine wheel and a second end facing toward the compressor wheel;

a first plurality of rolling elements disposed radially between the inner and outer rings and rotatably supporting the inner ring relative to the outer ring; and a second plurality of rolling elements disposed radially between the inner and outer rings and rotatably supporting the inner ring relative to the outer ring, the second plurality of rolling elements being axially spaced apart from the first plurality of rolling elements;
a radial gap being defined between the outer ring and the housing, lubricant flowing into the radial gap and radially separating the outer ring from the housing during operation of the turbocharger, the lubricant flowing from the radial gap into the radially-extending passages and into the annular passage;
a first axial gap being defined between the first end of the outer ring and the housing, the lubricant flowing into the first axial gap and axially separating the first end of the outer ring from the housing during operation of the turbocharger;
a second axial gap being defined between the second end of the outer ring and the compressor backplate, the lubricant flowing into the second axial gap and axially separating the second end of the outer ring from the compressor backplate.

\* \* \* \* \*

UNITED STATES PATENT AND TRADEMARK OFFICE
CERTIFICATE OF CORRECTION

PATENT NO. : 11,131,242 B2  
APPLICATION NO. : 16/766626  
DATED : September 28, 2021  
INVENTOR(S) : Thomas Zorn et al.

It is certified that error appears in the above-identified patent and that said Letters Patent is hereby corrected as shown below:

In the Claims

Claim 20, Column 21, Line 5, "lubricant flowing into the radial gap" should read --the lubricant flowing into the radial gap--

Signed and Sealed this  
Fourteenth Day of December, 2021

Drew Hirshfeld  
*Performing the Functions and Duties of the*  
*Under Secretary of Commerce for Intellectual Property and*  
*Director of the United States Patent and Trademark Office*